(12) United States Patent
Katerberg et al.

(10) Patent No.: US 9,372,127 B1
(45) Date of Patent: Jun. 21, 2016

(54) PRINTING SYSTEM CONTROLLED USING PHOTOELASTIC MEASUREMENT DEVICE

(71) Applicant: Eastman Kodak Company, Rochester, NY (US)

(72) Inventors: James A. Katerberg, Kettering, OH (US); Gary Alan Kneezel, Webster, NY (US)

(73) Assignee: EASTMAN KODAK COMPANY, Rochester, NY (US)

( * ) Notice: Subject to any disclaimer, the term of this patent is extended or adjusted under 35 U.S.C. 154(b) by 0 days.

(21) Appl. No.: 14/703,100

(22) Filed: May 4, 2015

(51) Int. Cl.
*G01L 1/24* (2006.01)
*B41J 29/393* (2006.01)

(52) U.S. Cl.
CPC .............. *G01L 1/241* (2013.01); *B41J 29/393* (2013.01)

(58) Field of Classification Search
CPC .............................. G01L 1/241; B41J 29/393
USPC ...................................................... 347/16, 19
See application file for complete search history.

(56) References Cited

U.S. PATENT DOCUMENTS

| | | | |
|---|---|---|---|
| 4,093,695 A | 6/1978 | Heirbaut | |
| 4,847,109 A * | 7/1989 | Shibasaki | G11B 5/85 427/128 |
| 5,288,995 A | 2/1994 | Strachan | |
| 5,376,999 A | 12/1994 | Hwang | |
| 5,663,510 A | 9/1997 | Niemann | |
| 7,536,955 B2 | 5/2009 | Bernard et al. | |
| 8,582,156 B2 | 11/2013 | Rudolph et al. | |
| 8,931,874 B1 | 1/2015 | Piatt et al. | |
| 2004/0129867 A1 | 7/2004 | Mackey | |
| 2011/0315036 A1* | 12/2011 | Bouma | B41F 13/02 101/484 |
| 2013/0169711 A1* | 7/2013 | Spence | B41J 15/06 347/18 |
| 2014/0232779 A1* | 8/2014 | Takeuchi | B41J 15/16 347/16 |

FOREIGN PATENT DOCUMENTS

| | | |
|---|---|---|
| DE | 8510912 | 1/1987 |
| DE | 29501373 | 4/1995 |
| WO | 2004/035922 | 4/2004 |

OTHER PUBLICATIONS

Daniel Post, "Optical analysis of photoelastic Polariscopes," Experimental Mechanics, vol. 10, pp. 15-23 (1970).
Chapter 6, "Photoelasticity" by Daniel Post, in *Manual on Experimental Stress Analysis*, 5th edition, Eds., James F. Doyle and James W. Phillips, Society for Experimental Mechanics, Bethel, Connecticut (1989).

* cited by examiner

*Primary Examiner* — Stephen Meier
*Assistant Examiner* — Alexander D Shenderov
(74) *Attorney, Agent, or Firm* — Kevin E. Spaulding

(57) ABSTRACT

A printing system is used printing an image on a web of media that is photoelastic and at least partially transparent. A web advance system advances the web of media supplied from an input roll in an in-track direction along a web transport path. At least one printing station is disposed along the web transport path for printing on the web of media. One or more photoelastic measurement devices disposed along the web transport path for characterizing stress in the web of media, and a controller that controls at least one aspect of the printing system responsive to signals received from the one or more photoelastic measurement devices.

19 Claims, 16 Drawing Sheets

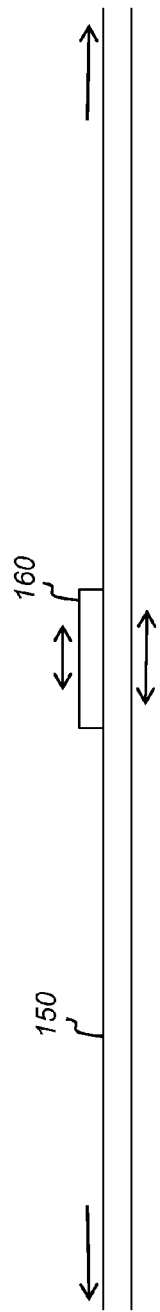
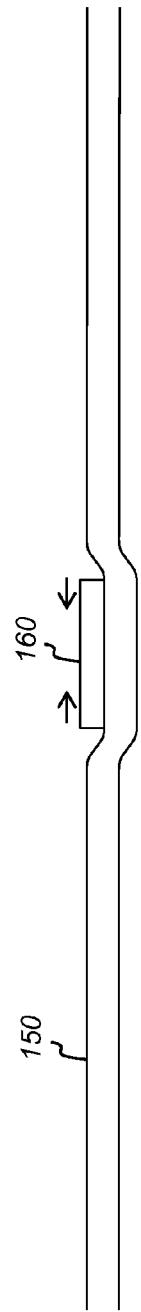
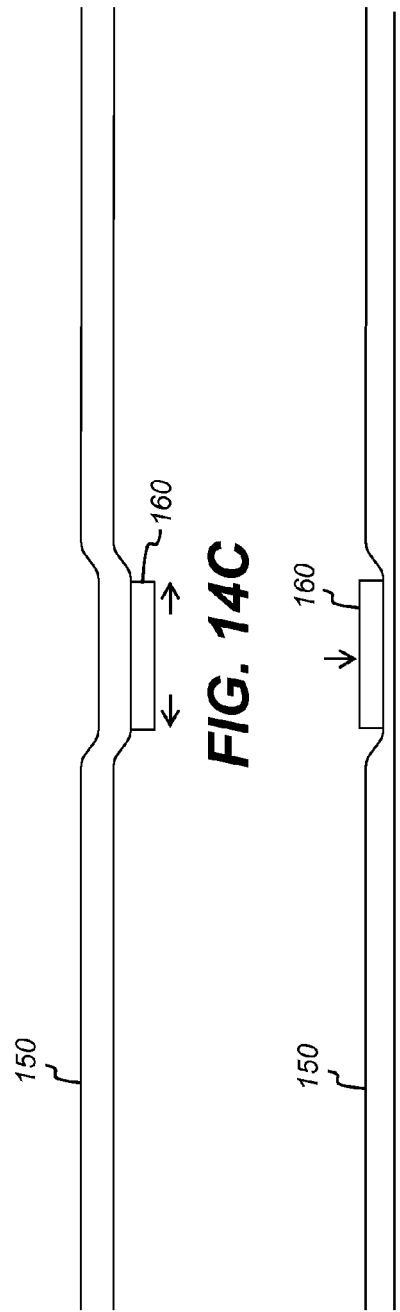

US 9,372,127 B1

PRINTING SYSTEM CONTROLLED USING PHOTOELASTIC MEASUREMENT DEVICE

CROSS-REFERENCE TO RELATED APPLICATIONS

Reference is made to commonly assigned, co-pending U.S. patent application Ser. No. 14/703,202, entitled: "Printing defect detection using photoelastic measurement device," by Kneezel et al., which is incorporated herein by reference.

FIELD OF THE INVENTION

This invention pertains to the field of digital printing, and more particularly to a digital printing system for printing on a web of media which is controlled responsive to signals received from a photoelastic measurement device that characterizes stress in the web of media.

BACKGROUND OF THE INVENTION

Many digital printing systems are adapted to print on a web of media. In order to provide reliable performance, it is necessary to accurately control the tension in the web of media. The tension in the web of media will be closely related to the stress in the media.

One method for characterizing stress in materials that are at least partially transparent and exhibit photoelasticity is by use of photoelastic measurement devices (i.e., polariscopes). Photoelastic materials exhibit birefringence effects that vary as a function of stress. Photoelastic measurement devices typically measure the stress in the material by characterizing the change in polarization of light which is transmitted through the material.

U.S. Pat. No. 4,093,695 to Heirbaut et al., entitled "Process for making polymeric film," teaches determining the orientation of the extrusion direction of a plastic film by means of a polariscope.

U.S. Pat. No. 4,847,109 to Shibasaki et al., entitled "Method of a making magnetic recording medium," discloses an apparatus for making magnetic tape. The illustrated configuration includes two tension sensors, one located upstream and one located downstream of a tensioning roller. Based on the output of the sensors, the tension control mechanism adjusts one of the drive speed of the tensioning roller or the position of the roller to thereby reduce the tension difference measured at the two locations. In some embodiments, the tension sensors are of a type capable of measuring the tension in terms of a change in photoelastic effect.

U.S. Pat. No. 5,288,995 to Strachan, entitled "Electrical measurement apparatus using heterodyne phase conversion techniques," provides a heterodyne system for analyzing the light from a Moiré fringe interferometer or a polariscope.

U.S. Pat. No. 5,376,999 to Hwang, entitled "Device for minimizing intermediate belt stretch and shrinkage in xerographic copier," teaches measuring the tension changes in a transport belt of a laser printer using the photoelastic effect.

U.S. Pat. No. 5,663,510 to Niemann et al., entitled "Method and device for compensating tension forces across the width of a moving web," teaches adjusting the orientation of a web guiding roller based on a measurement of the torque applied to the roller by the web.

U.S. Patent Application Publication 2004/0129867 to Mackey, entitled "Force measurement system using polarization-state modulated optical polarimetry," discloses a polariscope in which the light beam passes through a liquid crystal variable retarder prior to passing through the photoelastic material for enhancing the measurement of a stain in the photoelastic material.

There remains a need for improved control systems for printing systems that are able to compensate for performance variations that result from changes in stress in the media.

SUMMARY OF THE INVENTION

The present invention represents a printing system for printing an image on a web of media that is photoelastic and at least partially transparent, comprising:

a web advance system for advancing the web of media supplied from an input roll in an in-track direction along a web transport path;

at least one printing station disposed along the web transport path for printing on the web of media;

one or more photoelastic measurement devices disposed along the web transport path for characterizing stress in the web of media; and a controller that controls at least one aspect of the printing system responsive to signals received from the one or more photoelastic measurement devices.

This invention has the advantage that variations in the performance of the printing system can be reduced by monitoring stress in the web of media and making appropriate adjustments to aspects of the printing system.

It has the further advantage that variations in stress across the width of the web of media can be reduced by controlling adjustable force mechanisms responsive to stresses determined using photoelastic measurement devices.

It has the additional advantage that defects in a printed image can be detected by evaluating stress profiles determined using photoelastic measurement devices.

BRIEF DESCRIPTION OF THE DRAWINGS

FIG. 14A-14D illustrate mechanisms by which printing material can induce localized stress in a printed image;

It is to be understood that the attached drawings are for purposes of illustrating the concepts of the invention and may not be to scale. Identical reference numerals have been used, where possible, to designate identical features that are common to the figures.

DETAILED DESCRIPTION OF THE INVENTION

Figure 1:
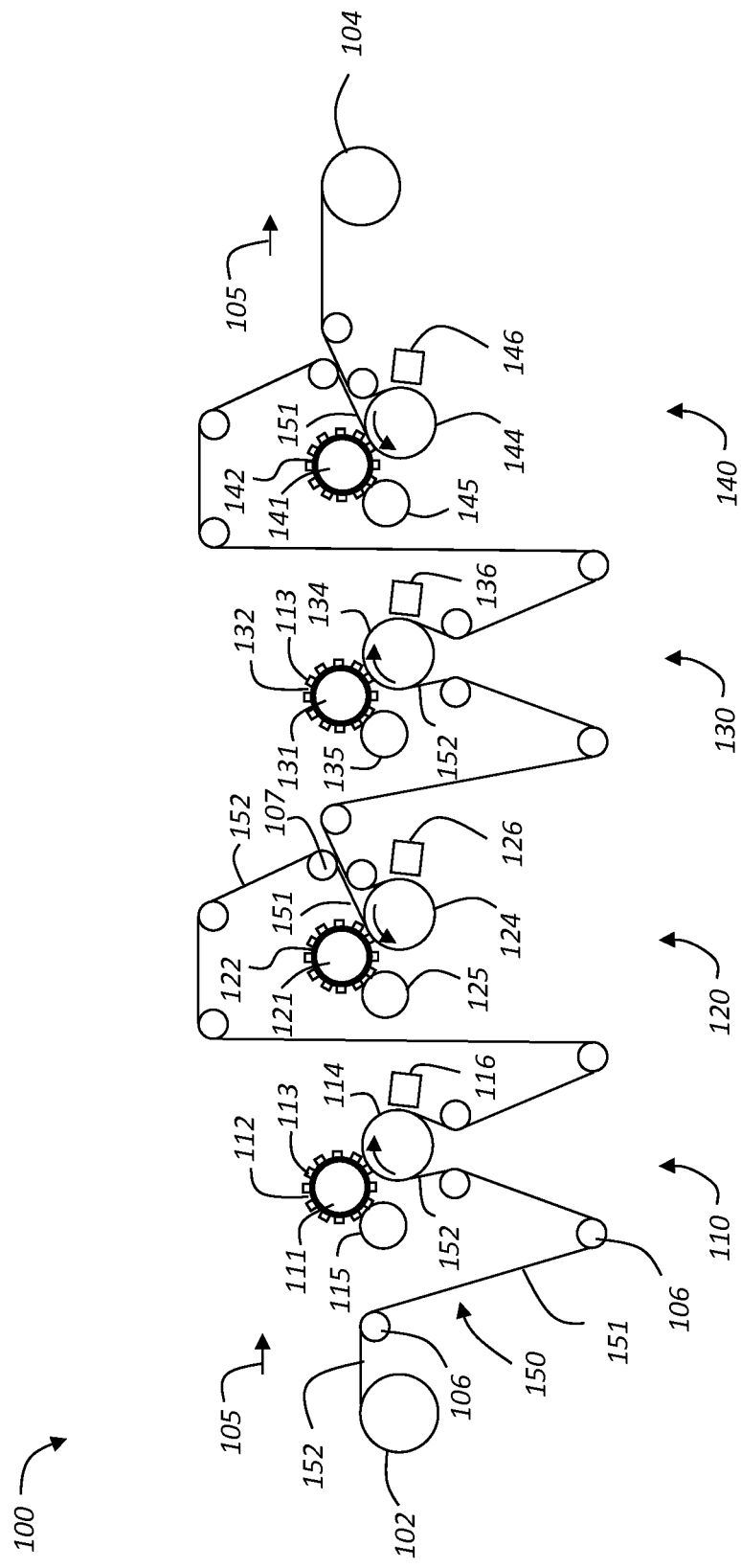
FIG. 1 shows a schematic side view of a portion of a flexographic printing system for roll-to-roll printing on both sides of a substrate.

The present description will be directed in particular to elements forming part of, or cooperating more directly with, an apparatus in accordance with the present invention. It is to be understood that elements not specifically shown, labeled, or described can take various forms well known to those skilled in the art. In the following description and drawings, identical reference numerals have been used, where possible, to designate identical elements. It is to be understood that elements and components can be referred to in singular or plural form, as appropriate, without limiting the scope of the invention.

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art. It should be noted that, unless otherwise explicitly noted or required by context, the word "or" is used in this disclosure in a non-exclusive sense.

The example embodiments of the present invention are illustrated schematically and not to scale for the sake of clarity. One of ordinary skill in the art will be able to readily determine the specific size and interconnections of the elements of the example embodiments of the present invention.

As described herein, exemplary embodiments of the present invention are described relative to web transport systems for use in printing cylinder systems (e.g., flexographic printing systems or offset printing systems) that are used for printing functional devices. Examples of such functional devices would include touch screen sensors. However, many other applications are emerging for printing of functional devices that can be incorporated into other electronic, communications, industrial, household, packaging and product identification systems (such as RFID) in addition to touch screens. Flexographic printing and offset printing are conventionally used for printing of images and it is contemplated that the web transport systems described herein can also be advantageous for such conventional printing applications. Furthermore, the described web transport systems can also be used in other types of web-based printing system such as continuous inkjet printing systems or electrophotographic printing systems.

FIG. 1 is a schematic side view of a portion of a flexographic printing system 100 that can be used in embodiments of the invention for roll-to-roll printing on both sides of a web of media 150. Web of media 150 is fed from supply roll 102 to take-up roll 104 through flexographic printing system 100. Web of media 150 has a first side 151 and a second side 152.

The flexographic printing system 100 includes two print stations 120 and 140 that are configured to print on the first side 151 of the web of media 150, as well as two print stations 110 and 130 that are configured to print on the second side 152 of the web of media 150. The web of media 150 travels overall in roll-to-roll direction 105 (left-to-right in the example of FIG. 1). Various freely rotating web-transport rollers 106 and 107 (sometimes called idler rollers) between successive print stations are used to locally change the direction of the web of media 150, provide a buffer, and reverse a side for printing. In particular, note that in print station 120 the web-transport roller 107 serves to reverse the local direction of the web of media 150 so that it is moving substantially in a right-to-left direction. The entire path of the web of media 150 from the supply roll 102 to the take-up roll 104 is known as the web transport path.

Each of the print stations 110, 120, 130, 140 located along the web transport path includes a set of similar components including a respective plate cylinder 111, 121, 131, 141, on which is mounted a respective flexographic printing plate 112, 122, 132, 142, respectively. Collectively, the plate cylinder 111, 121, 131, 141 and the respective flexographic printing plate 112, 122, 132, 142 can be referred to as a printing cylinder 117, 127, 137, 147. Each flexographic printing plate 112, 122, 132, 142 has raised features 113 defining an image pattern to be printed on the web of media 150. Each print station 110, 120, 130, 140 also includes a respective impression cylinder 114, 124, 134, 144 that is configured to force a side of the web of media 150 into contact with the corresponding flexographic printing plate 112, 122, 132, 142. The impression cylinders 124 and 144 of print stations 120 and 140 (for printing on the first side 151 of the web of media 150) rotate in a counter-clockwise direction in the view shown in FIG. 1, while the impression cylinders 114 and 134 of print stations 110 and 130 (for printing on the second side 152 of the web of media 150) rotate in a clockwise direction in this view.

Each print station 110, 120, 130, 140 also includes a respective anilox roller 115, 125, 135, 145 for providing ink to the corresponding flexographic printing plate 112, 122, 132, 142. Within the context of the present invention, the term "ink" is used broadly to refer to any substance with is printed onto the web of media 150. The ink may or may not include pigments or other colorants that are visible to a human observer. As is well known in the printing industry, an anilox roller is a hard cylinder, usually constructed of a steel or aluminum core, having an outer surface containing a large number of very fine dimples, known as cells. Ink is controllably transferred and distributed onto the anilox roller by an ink pan and fountain roller (not shown) or by an ink reservoir chamber (not shown). In some embodiments, some or all of the print stations 110, 120, 130, 140 also include respective UV curing modules 116, 126, 136, 146 for curing the printed ink on web of media 150.

In a flexographic printing system or in an offset printing system, the repeat length L of printed images is substantially equal to the circumference of the printing cylinder 117, 127, 137, 147. In print station 110 of flexographic printing system 100, for example, the circumference of the printing cylinder is the outer circumference of the flexographic printing plate 112 wrapped around the plate cylinder 111. In an offset printing system (not shown) the circumference of the printing cylinder 117, 127, 137, 147 is simply the circumference of the cylinder on which the master image is formed. The length of the actual printed image is typically less than the repeat length L. There is typically a margin of unprinted substrate between two successive printed images. A complete revolution of the printing cylinder 117, 127, 137, 147 prints one repeat length L of web of media 150.

Figure 2:
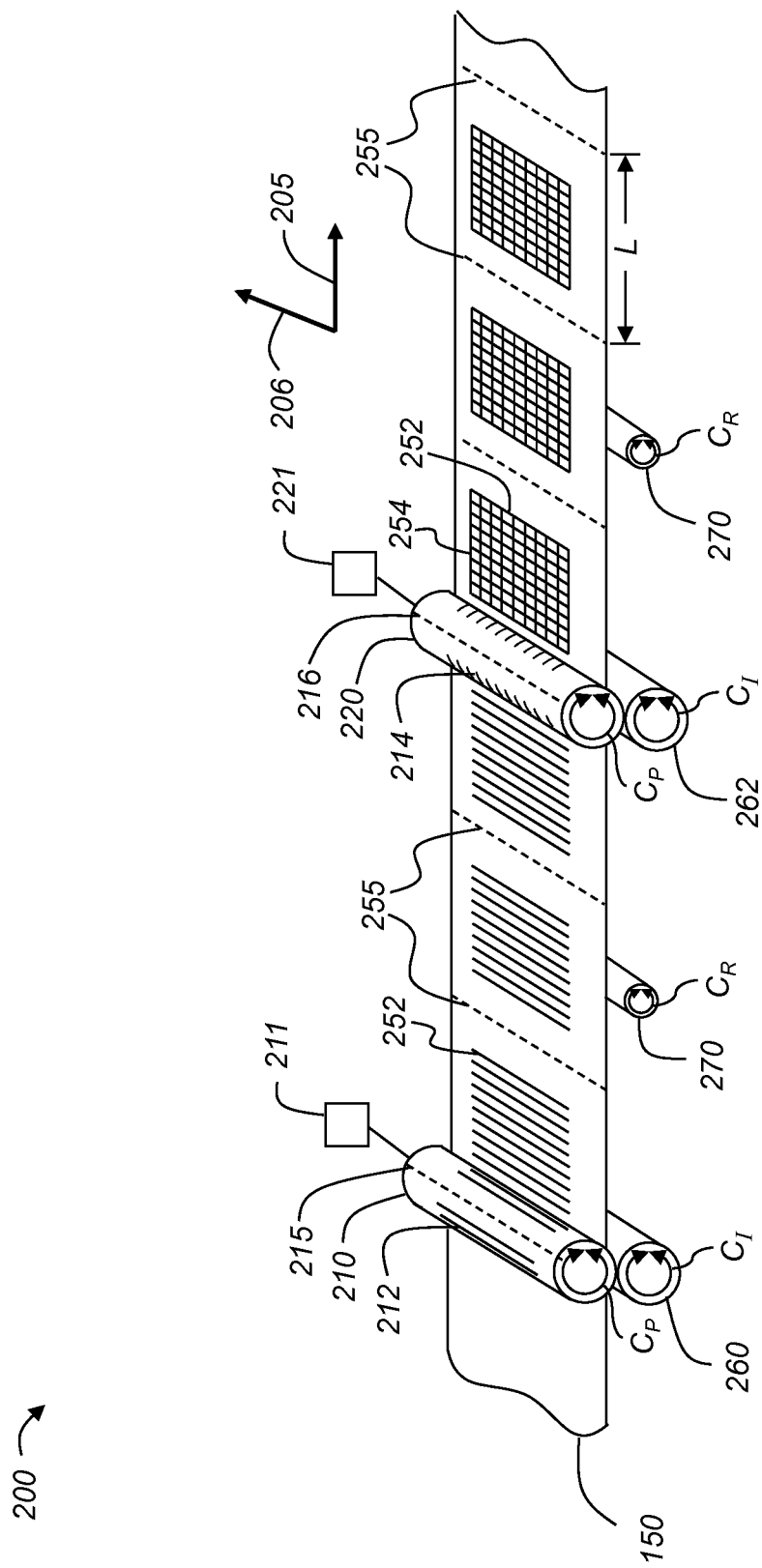
FIG. 2 shows a schematic view of a portion of a printing system having printing cylinders for printing on a web of media.

FIG. 2 shows a schematic view of a portion of a printing system 200 having two printing cylinders 210 and 220. Printing cylinder 210 having a master image 212 for printing a first printed image 252 on web of media 150 and printing cylinder 220 having a master image 214 for printing a second printed image 254 on web of media 150, as the web of media 150 is advanced along the in-track direction 205. The first printed image 252 represents a first portion of the final printed image, and the second printed image 254, which is printed in register with the first printed image 252, represents a second portion of the final printed image. In the illustrated arrangement, the first and second printed images 252, 254 are printed with the same ink and represent vertical and horizontal lines, respectively, which combine to form a grid. In other arrangements, the first and second printed images 252, 254 can be printed using different inks representing different color channels for a color image.

Master image boundaries 215 and 216 on the printing cylinders are represented using dashed lines. For the case of flexographic printing, printing cylinders 210, 220 can correspond to plate cylinders 111, 121 (FIG. 1). In this case, the master image boundary 215, 216 can represent the joint or gap between a first end and a second end of the flexographic printing plates 112, 122 (FIG. 1) wrapped around the plate cylinder 111, 121. Printing cylinder 210 has a circumference $C_p$, which in the case of flexographic printing is the outer circumference of the flexographic printing plates 112, 122 as mentioned above.

Frame boundaries 255 are represented by dashed lines superimposed on web of media 150. Printed image 252 fits between two adjacent frame boundaries 255. In this example, printed image 252 includes a set of lines that extend in a cross-track direction 206, and printed image 254 includes a set of lines that extend in the in-track direction 205. The distance between adjacent frame boundaries 255 is repeat length L. Repeat length L is substantially equal to the circumference $C_p$ of printing cylinder 210, but it can differ slightly, for example if there is slippage between web of media 150 and the printing cylinder 210 (i.e., if the web velocity is different from the tangential velocity of the printing cylinder 210).

Impression cylinder 260 (having a circumference $C_I$) provides support for web of media 150 at the nip where printing cylinder 210 contacts web of media 150, and impression cylinder 262 provides support for the web of media 150 at the nip where printing cylinder 220 contacts the web of media. Also shown is a web-transport roller 270 (having a circumference $C_R$) for supporting and guiding the web of media 150.

Rotation of printing cylinders 210 and 220 is driven (directly or indirectly) by motors 211 and 221 respectively. In some embodiments, each of the motors 211, 221 can be used to drive a plurality of components. For example, the motor 211 can be used to drive both the printing cylinder 210 and the impression cylinder 260 through appropriate gearing. In some embodiments, additional motors (not shown in FIG. 2) can be used to drive other components, such as the impression cylinders 260, 262. As the web of media 150 is advanced along in-track direction 205 by drive rollers (not shown in FIG. 2), printed image 252, which includes lines extending in the cross-track direction 206, is first printed by printing cylinder 210 on a portion of the web of media 150. Subsequently, as the portion of the web of media 150 advances past printing cylinder 220, printed image 254 is printed, which includes lines extending in the in-track direction 205.

For the printed image 254 to remain registered to printed image 252, the printed image 254 must have the same repeat length L as the printed image 252. In order for the printed image 254 to have the same repeat length L as the printed image 252, the circumference Cp of printing cylinder 220 needs to be the same as the circumference Cp of printing cylinder 210. The tension of the web of media 150 must also be the maintained at a consistent value at both printing cylinders 210, 220. This can be understood by way of example. Consider a web of media 150 that is printed on by a first printing cylinder 210 of circumference Cp=L at a first tension. The repeat length of the corresponding printed image 252 will be L while the tension is maintained at the first tension. However if the tension is reduced the media will shrink some so that the repeat length of the printed image 252 is no longer L, but rather will be a shorter length L'. If the printed image 254 is then printed on the web of media 150 at the lower tension by the second printing cylinder 220 having circumference Cp=L, the second printed image 254 will have a repeat length of L, while the first printed image 252 will have a repeat length of L'. The repeat length of the printed images 252, 254 printed by the two printing cylinders 210, 220 will therefore differ, causing the printed images 252, 254 to be misaligned.

Many materials used for transparent plastic films, such as low density polyethylene (LDPE), high-density polyethylene (HDPE), polypropylene, polyethylene terephthalate (PET), polyvinyl chloride (PVC), polyvinylidene chloride, polyester, nylon, or cellophane film or fiber, are photoelastic. Photoelastic materials exhibit birefringence when they are stressed so that the polarization properties of light transmitted through the material is changed as a function of the stress in the material. Birefringence is a property of materials where they exhibit different refractive indices depending on the polarization and propagation direction of light. By measuring the change in the polarization of transmitted light, a measure of the stress in the material can obtained.

Figure 3:
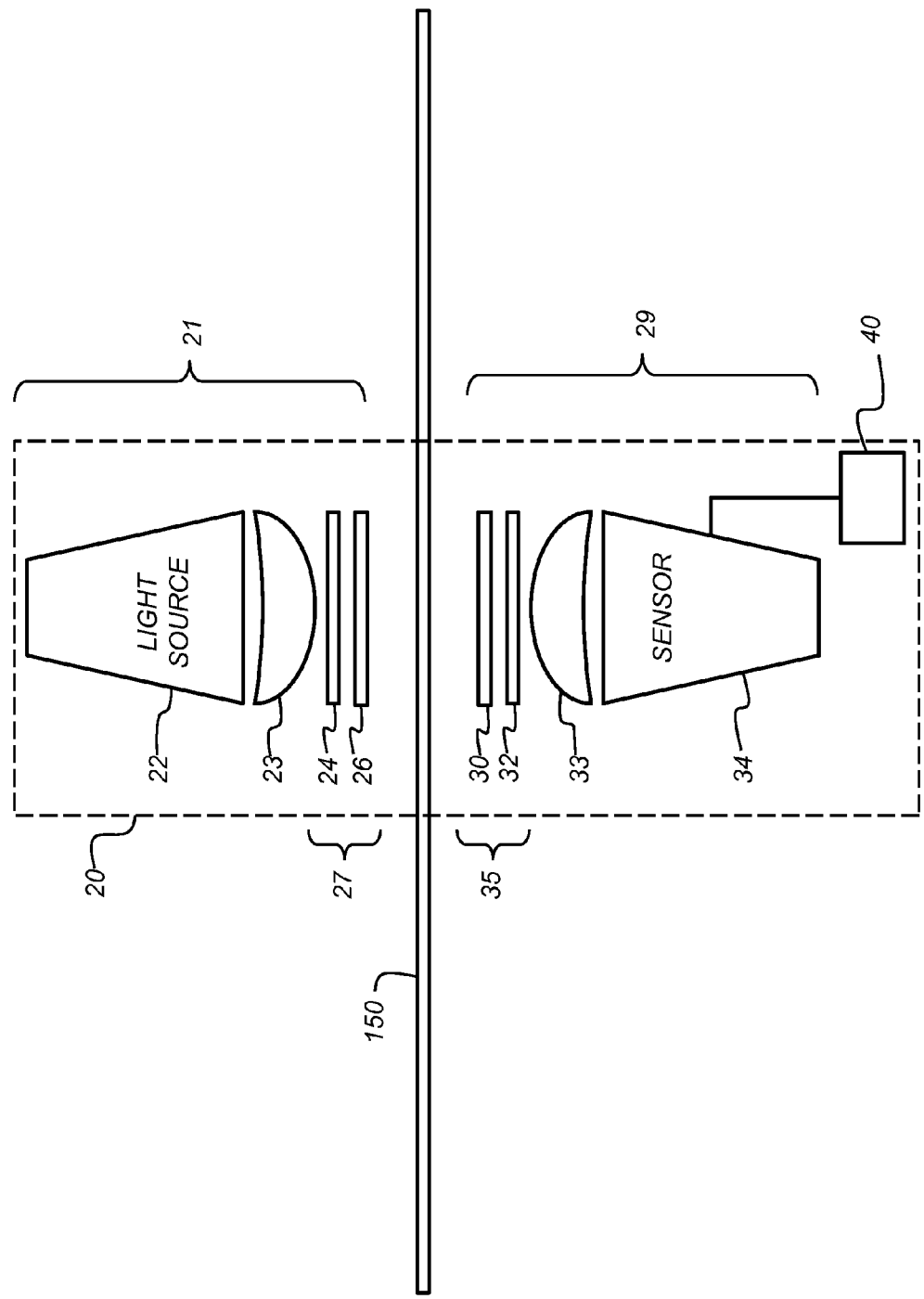
FIG. 3 shows a schematic side view of a transmission photoelastic measurement device.

Photoelastic measurement devices, commonly called "polariscopes," are used to characterize the stress in a photoelastic material by measuring the polarization properties of the material. An example of a transmission photoelastic measurement device 20 is shown in FIG. 3. The photoelastic measurement device 20 includes illumination optical components 21 and detection optical components 29. The illumination optical components 21, positioned on a first side of the web of media 150 to be tested, include a light source 22, a first lens 23, a first linear polarizer 24 and a first quarter wave plate 26. The detection optical components 29, positioned on the opposite side of the web of media 150, include a second quarter wave plate 30, a second linear polarizer 32, a second lens 33 and a sensor 34. Each linear polarizer 24, 32 together with its adjacent quarter wave plate 26, 30 combine to form a circular polarizing filter 27, 35.

It is well-known that the intensity of light detected by the sensor 34 of such a photoelastic measurement device 20 is given by:

$$I = A^2 \cos^2\left((\sigma_1 - \sigma_2)K\frac{T}{\lambda}\right) \quad (1)$$

where A is a scaling factor dependent on the intensity of the light source 22 and on the optics, $\sigma_1$ and $\sigma_2$ are the principal stresses, K is a scaling factor that is a property of the material of the web of media 150, T is the thickness of the web of media 150, and $\lambda$ is the wavelength of the light from the light source 22. (For example, see Chapter 6, "Photoelasticity" by Daniel Post, in *Manual on Experimental Stress Analysis*, 5th edition, Eds., James F. Doyle and James W. Phillips, Society for Experimental Mechanics, Bethel, Connecticut, 1989, which is incorporated herein by reference.) For typical printing applications, the scaling factors A and K and the thickness of the web of media 150 are approximately constant. For monochromatic light sources, the detected light intensity varies sinusoidally with the stress (e.g., $\sigma_1$ and $\sigma_2$) in the web of media 150. A change in the stress of the web of media 150 will therefore produce a change in the intensity of the light detected by the sensor 34.

When white light or light of multiple wavelengths is used for illumination, each wavelength of illumination produces its own intensity pattern at the sensor. The result is a superposition of the various intensity patterns, producing a hue at the sensor 34 that is a function of the stress in the material. By detection of the hue shifts with a color sensitive detector, white light illumination can provide more accurate determinations of the stress changes in the web of media 150 under certain conditions than monochromatic illumination.

Figure 4:
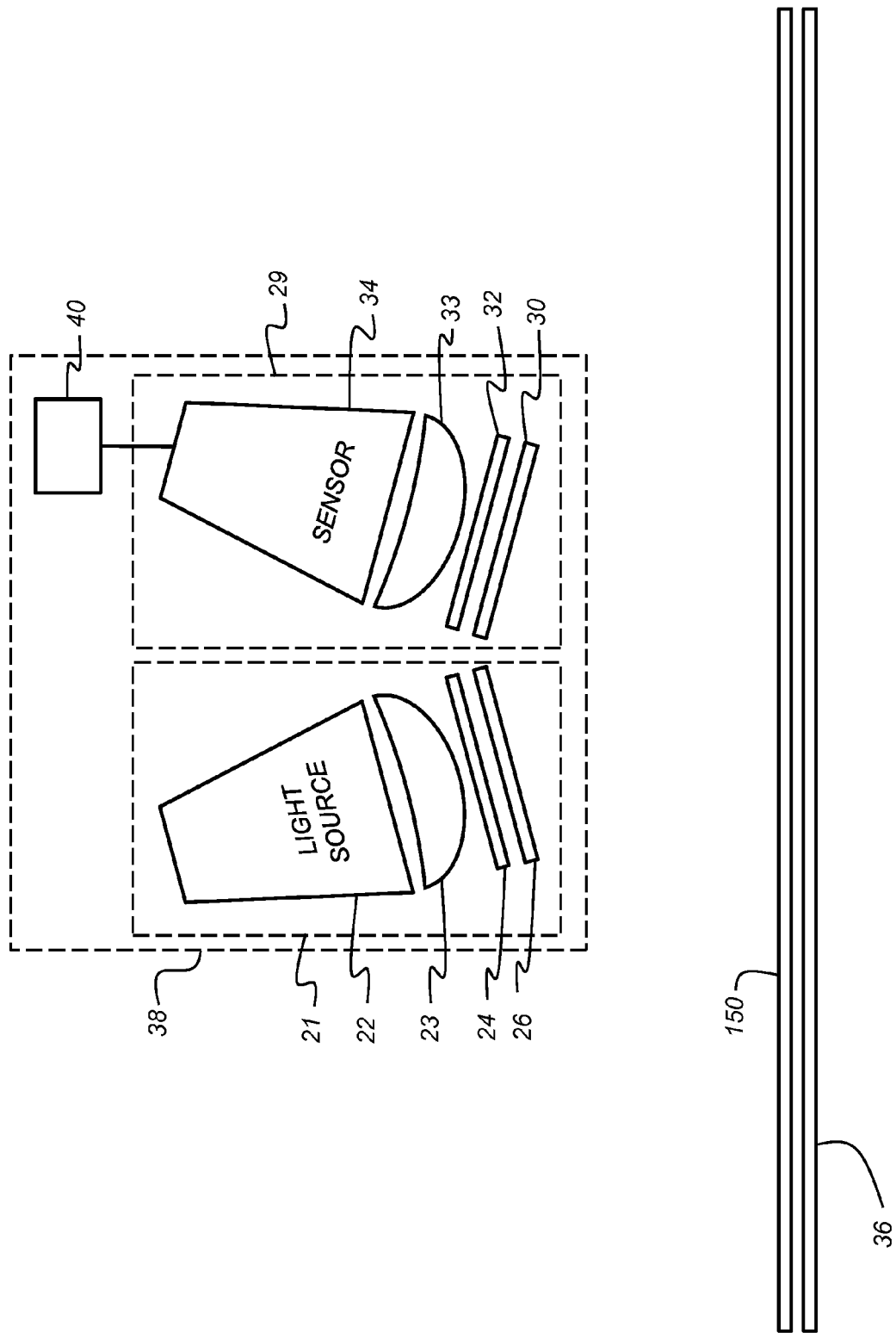
FIG. 4 shows a schematic side view of a reflective photoelastic measurement device.

FIG. 4 shows an alternate form of a reflective photoelastic measurement device 38, often referred to as a "reflective polariscope" or a "doubling polariscope." In this configuration, the illumination optical components 21 and the detection optical components 29 are on the same side of the web of media 150. A reflector 36 positioned on the second side of the web of media 150 reflects the light from the illumination optical components 21 back toward the detection optical components 29. Depending on the application, the reflector 36 can be distinct from the web of media 150, such as a roller or fixed metal surface over which the web of media 150 moves. Alternatively, the reflector 36 can comprise a reflective coating that has been applied to the second side of the web of media 150. As the light makes two passes through the web of media 150, the effective thickness of the web of media 150 is twice the actual thickness, making the reflective photoelastic measurement device 38 of FIG. 4 more sensitive to stress than the transmission photoelastic measurement device 20 of FIG. 3.

As the intensity of the light varies cyclically (i.e., sinusoidally) with stress, the stress pattern profile in the web of media 150 detected by a photoelastic measurement device 20, 38 consists of a pattern of multiple fringes where every point along a fringe has the same stress and where the different fringes correspond to different stress levels. To determine whether two points on the web of media 150 have the same stress therefore requires analysis to determine whether the two points are at the same fringe stress contour level. Unless the stress only varies within a range that corresponds to a single fringe spacing, it is necessary to use a sensor 34 that is either an area array sensor or linear array sensor to enable the pattern of multiple fringes to be detected and analyzed. The analysis of the output of the sensor 34 is carried out in a processor 40, which can analyze the intensity profile with potentially multiple fringe contours to provide a measure of the stress, either at a point of interest in the field of view or throughout the field of view. The processor 40 may also be able to adjust the rotation angle of the second linear polarizer 32, which can shift the fringe pattern to aid in the analysis of the stress levels. The processor 40 can be physically integrated into the photoelastic measurement device 20, 38, or it can be included in some other portion of the printing system such as the printing system controller. For description simplicity, the output of the photoelastic measurement device 20, 38 will refer to the output of processor 40, which analyzes the output of the sensor 34, the output of the processor 40 being a signal indicative of a level of stress in the web of media 150, independent of whether the processor is physically integrated into the photoelastic measurement device 20, 38 or resides elsewhere.

Figure 5:
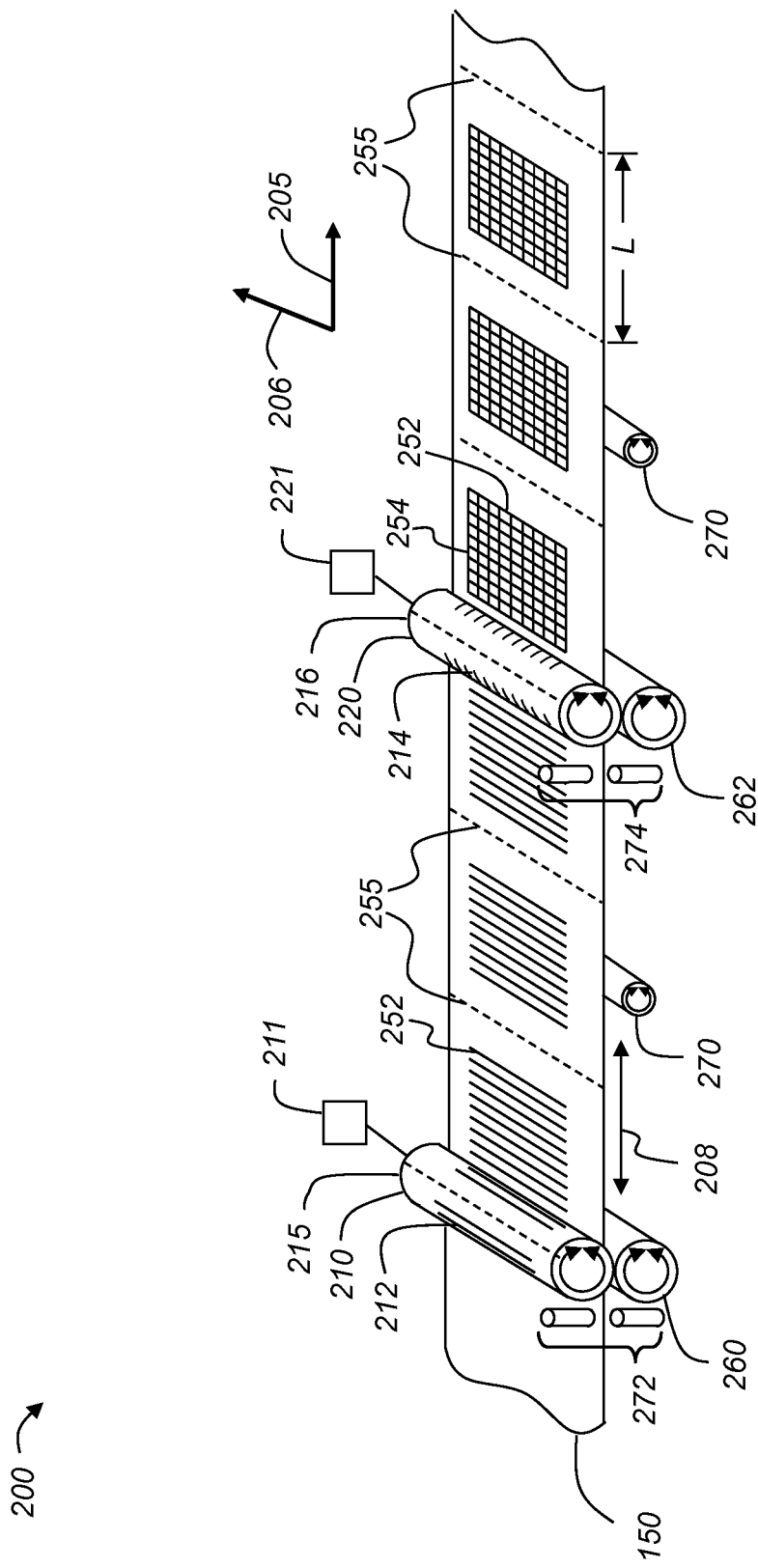
FIG. 5 shows a schematic view of a portion of a printing system having printing cylinders for printing on a web of media which is controlled using signals from photoelastic measurement devices.

FIG. 5 shows an embodiment of an exemplary printing system 200 having two printing stations similar to that shown in FIG. 2. The printing system 200 includes two photoelastic measurement devices 272, 274, which, for example, can be transmission photoelastic measurement devices 20 (FIG. 3) or reflective photoelastic measurement devices 38 (FIG. 4). The photoelastic measurement devices 272, 274 are positioned to characterize the stress in the web of media 150 as it is advanced along web transport path 208 using a web advance system (not shown).

The use of photoelastic measurement devices 272, 274 in the printing system 200 provides a non-contact means to monitor the stress in the web of media 150. The web of media 150 is photoelastic and at least partially transparent. Photoelastic measurement device 272 is positioned just upstream of printing cylinder 210 and photoelastic measurement device 274 is positioned just upstream of printing cylinder 220. A controller (not shown) receives output from each photoelastic measurement device 272, 274, from which it can determine the stress differences in the media at the two locations. The controller can adjust one or more aspects of the printing system 200 to ensure the stresses in the media match. By balancing the stresses just upstream of both printing cylinders 210, 220 the printing system 200 can provide more consistent registration of the printed images 252, 254 printed by the two printing cylinders 210, 220. In some embodiments, an aspect of the printing system 200 that can be controlled to adjust the stress in the web of media 150 is the speed of one or both of the printing cylinders 210, 220. (The speed of the printing cylinders 210, 220 can be controlled by controlling the corresponding motors 211, 221.) Various components of the web transport/tensioning system can also be controlled responsive to the signals from the photoelastic measurement devices 272, 274, such as controlling the speed or position of drive rollers and web steering rollers (not shown in FIG. 5) located along the web transport path 208. Other aspects of the printing system 200 that can be controlled responsive to the signals from the photoelastic measurement devices 272, 274 include adjusting a power profile provide to web drying/curing devices, or adjusting image registration using any appropriate registration correction components and methods known in the art.

In some arrangements, the stress determined using the photoelastic measurement devices 272, 274 can be monitored as a function of time, and one or more aspects of the printing system 200 can be controlled responsive to a difference between the stress determined at a first time and a stress determined at a second later time. In this way, the printing system 200 can make adjustments appropriate to keep the stress in the web of media 150 consistent if it starts to drift over time. This enables the printing system 200 to be maintained in a stable operating condition so that the resulting printed images 252, 254 have a consistent quality level.

Figure 6:
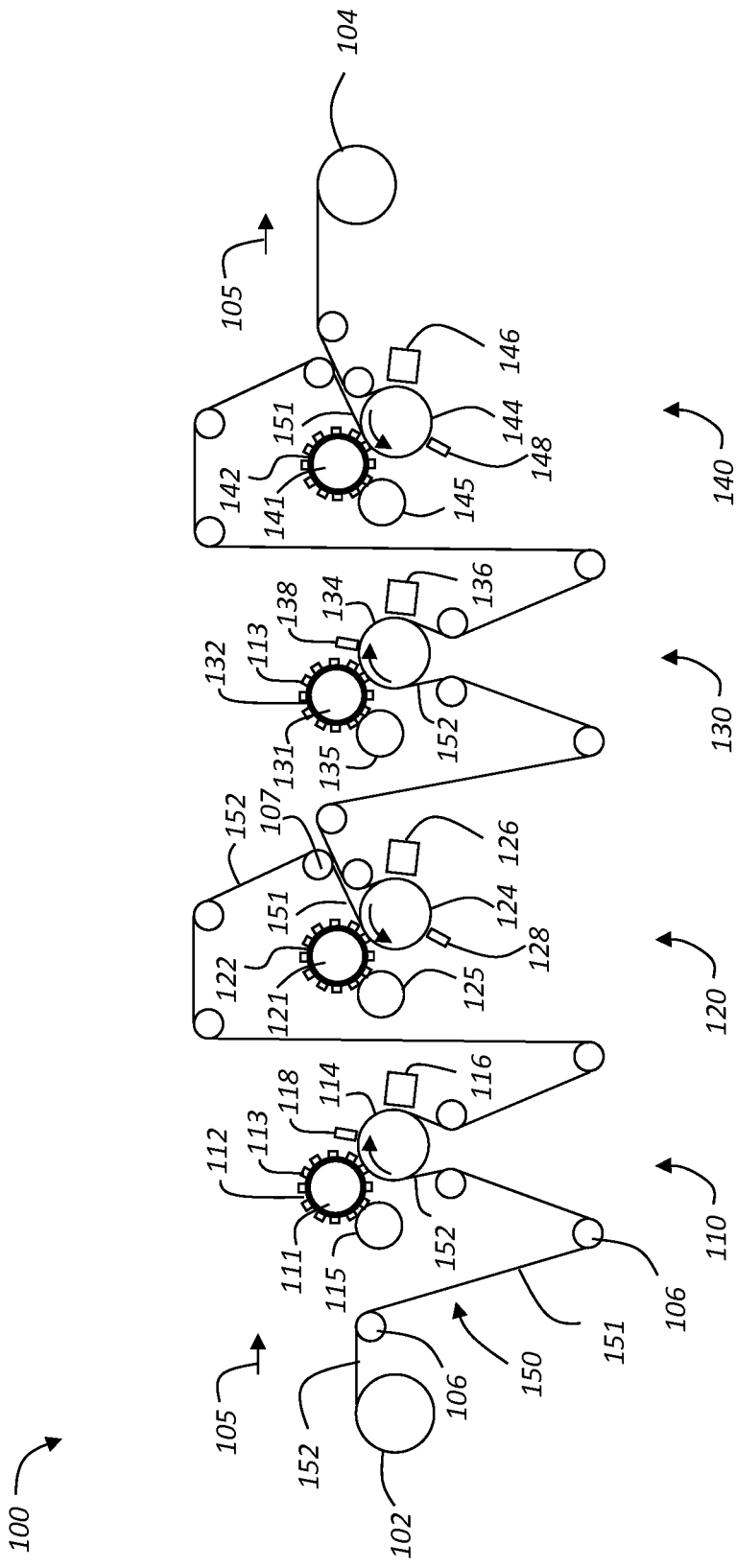
FIG. 6 shows a schematic side view of a portion of a flexographic printing system for roll-to-roll printing on both sides of a substrate which is controlled using signals from photoelastic measurement devices.

Another exemplary embodiment is shown in FIG. 6, which illustrates a printing system 100 similar to that shown in FIG. 1. In this configuration, photoelastic measurement devices 118, 128, 138, 148 are used to monitor the stresses in the web of media 150 as it is wrapped around respective impression cylinders 114, 124, 134, 144. The placement of the photoelastic measurement devices 118, 128, 138, 148 in a position adjacent to the impression cylinders 114, 124, 134, 144 enables the stress in the web of media 150 to be monitored essentially at the different print locations. In some configurations, the photoelastic measurement devices 118, 128, 138, and 148 can be the reflective photoelastic measurement devices 38 described in FIG. 4. The relative speeds of the cylinders in the different print stations 110, 120, 130, 140 can be adjusted based on output from the photoelastic measurement devices 118, 128, 138, and 148 so that the tension and stress in the web of media 150 can be matched at each print station 110, 120, 130, 140.

Figure 7:
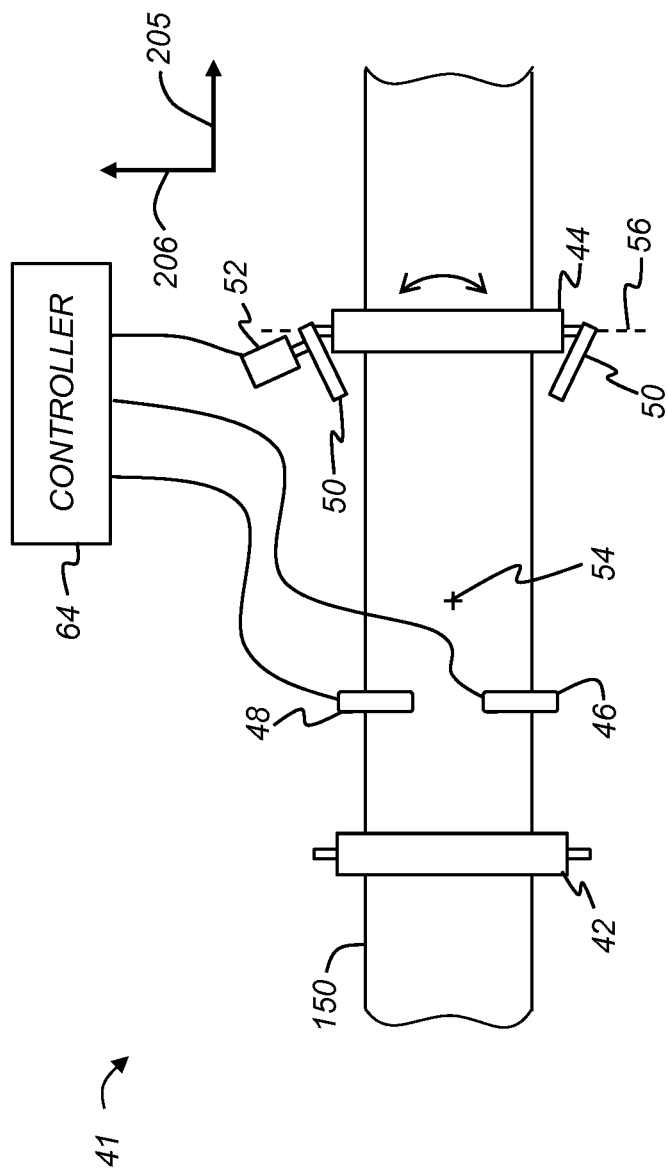
FIG. 7 shows a schematic top view of a portion of a web transport system including a steered roller which is controlled using signals from photoelastic measurement devices.

In a web transport system, it is desirable for the web of media 150 to track through the web transport path 208 (FIG. 5) without wandering back and forth in the cross-track direction 206. Unfortunately variations in tension across the web of media 150 tend to cause the media to drift in the cross-track direction 206 toward the edge of the media with the higher tension. In prior art systems, active web guiding systems are used in which the cross-track position of the web of media 150 is measured, and then in response the web of media 150 is steered by adjusting active web guiding components to return the web of media 150 to the desired cross-track position. Such prior art systems require the cross-track position of the web of media 150 to shift by a measurable amount before a correction can be made to the web steering. FIG. 7 illustrates an embodiment of a web transport system 41 for use in a digital printing system that overcomes this problem by using photoelastic measurements of the stress differential across the web, and making web steering adjustments based on the measured stress differential across the web of media 150 even before the stress differential can produce a measurable cross-track drift.

In the configuration of FIG. 7, the web of media 150 is guided in an in-track direction 205 by a first roller 42 and a second roller 44. The second roller 44 is mounted by means of pivot arms 50 attached to each end of the roller shaft. The pivot arms 50 allow a rotation axis 56 of the second roller 44 to pivot around a caster axis 54. Actuator 52 interacts with the second roller or the pivot arms to adjust the orientation of the rotation axis 56.

Photoelastic measurement devices 46, 48 are located near both edges of the web of media 150 between the first and the second rollers. The photoelastic measurement devices 46, 48 can be, for example, transmission photoelastic measurement devices 20 (FIG. 3) or reflective photoelastic measurement devices 38 (FIG. 4). Preferably the two photoelastic measurement devices 46, 48 are mounted directly across from each other, at a common in-track position and different cross-track positions to minimize the detection of web tension variations along the in-track direction 205. By comparing the output of the two photoelastic measurement devices 46, 48, the controller 64 can identify stress differences across the width of the web of media 150. The controller 64 can then adjust the orientation of the rotation axis 56 of the roller 44 using the actuator 52 to bring the stress difference across the web of media 150 back to zero.

In the configuration illustrated in FIG. 7, the steered roller 44 has an adjustable caster angle that can be adjusted using the actuator 52. In alternate embodiments, a gimbal-mounted roller can be used where a rotation axis of the roller is steered by means of an actuator. Such a steered gimbal-mounted roller is typically located upstream of the photoelastic measurement devices 46, 48 used to measure the stress differential.

By providing reduced stress differentials across the web, such an active web steering system can improve the cross-track positioning stability of the web of media 150, and can aid in improving registration between the image content printed by a sequence of printing stations. By providing reduced stress differentials across the web of media 150, the risk of inelastic distortion of the web of media 150 can also be reduced.

As an alternative to locating separate photoelastic measurement devices 46, 48 along each edge of the web of media 150, a single full-width photoelastic measurement device (not shown) can be used whose field of view includes the entire width of the web of media 150. Typically, the full-width photoelastic measurement device 72 will include an array of sensors 34 (FIG. 3) distributed across the cross-track direction 206 of the web of media 150, thereby enabling the stress to be determined as a function of cross-track position. (The full-width photoelastic measurement device 72 can be viewed as an array of individual photoelastic measurement devices at positions corresponding to the positions of the sensors 34.) The use of a full-width photoelastic measurement device enables the stress profile to be measured across the entire width of the web of media 150. The steered roller 44 can then be adjusted in accordance with the measured stress profile to reduce any stress differentials indicated by the stress profile.

While the configuration of FIG. 7 shows two photoelastic measurement devices 46, 48 at the same in-track position along opposite edges of the web of media 150, it will be obvious to one skilled in the art that this arrangement can be generalized to include more than two photoelastic measurement devices 46, 48 that are separated from one another along a cross-track direction 206 of the web of media 150. For example, a third photoelastic measurement device (not shown) could be added to characterize the stress in the center of the web of media 150.

Figure 8:
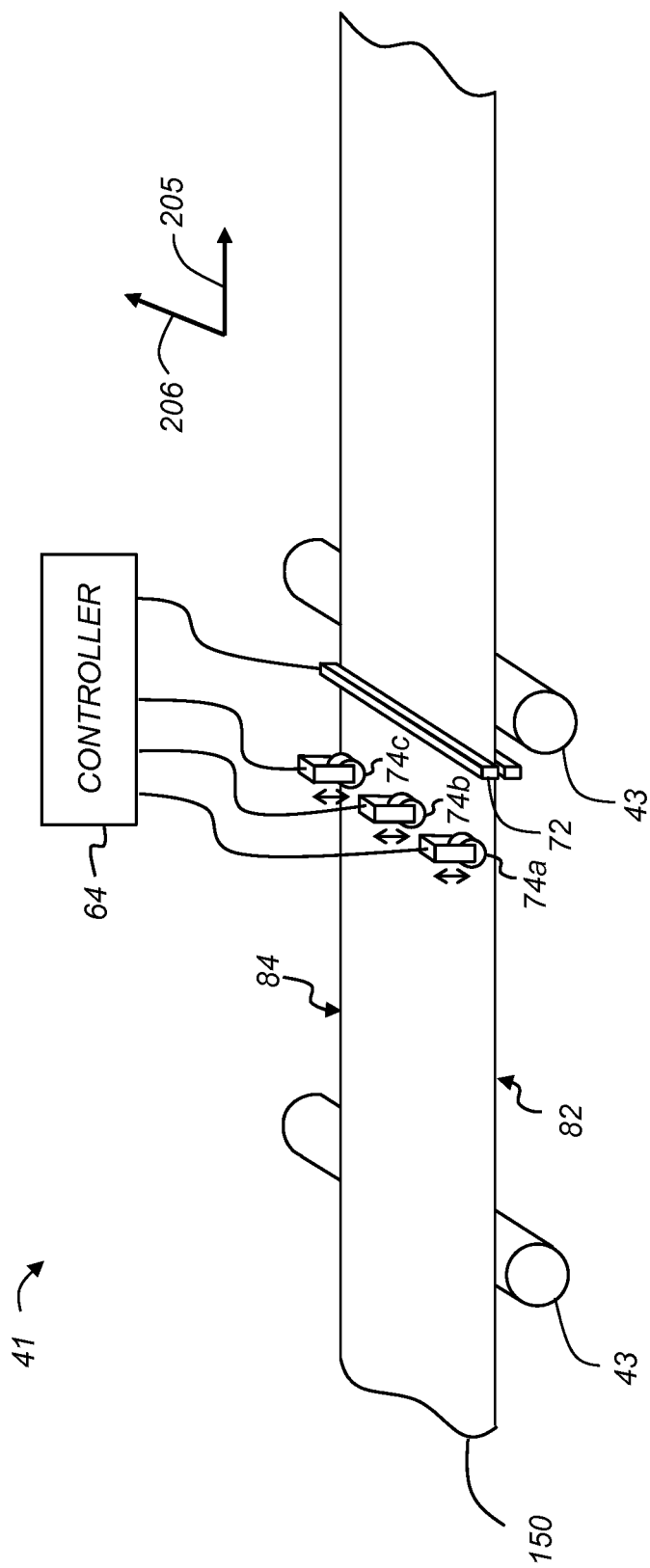
FIG. 8 shows a schematic view of a portion of a web transport system including a plurality of rollers that provide adjustable forces to a web of media responsive to signals from a photoelastic measurement device.
Figure 9:
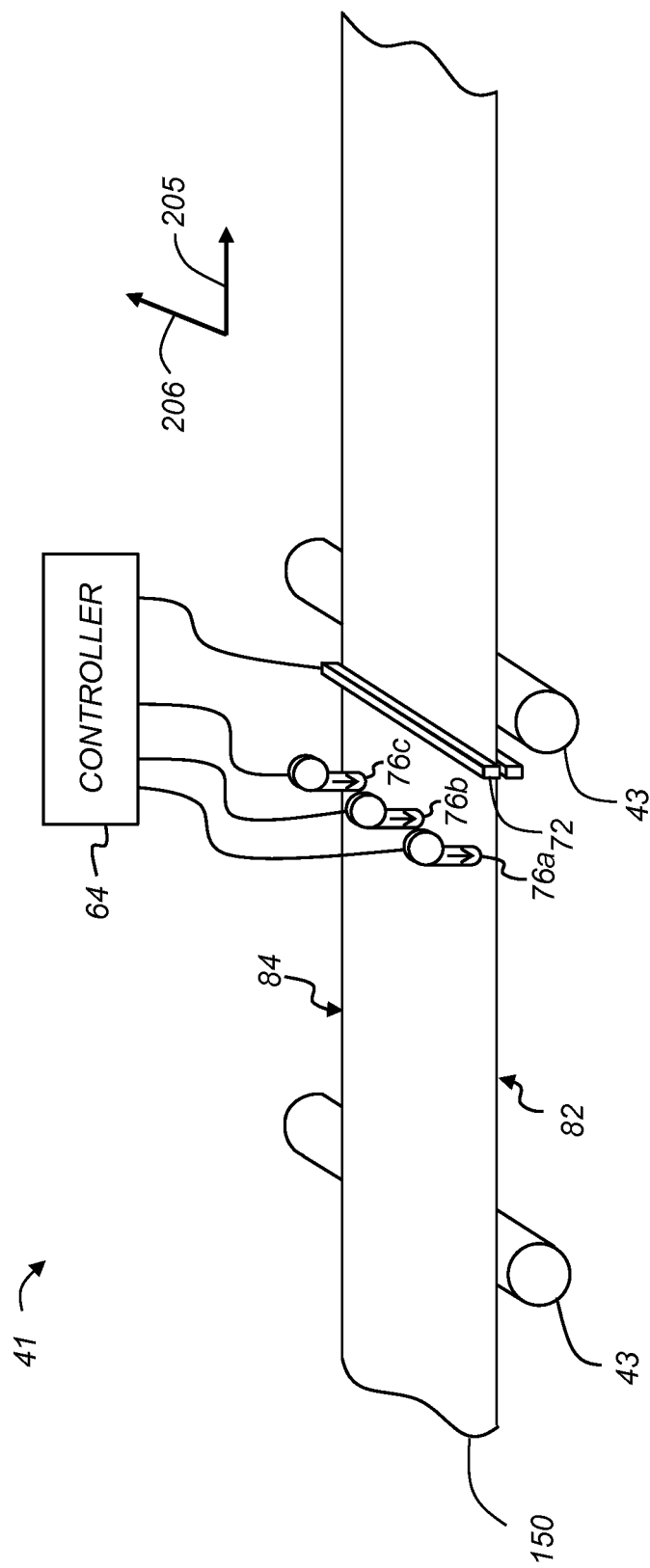
FIG. 9 shows a schematic view of a portion of a web transport system including a plurality of air sources that provide adjustable forces to a web of media responsive to signals from a photoelastic measurement device.
Figure 10:
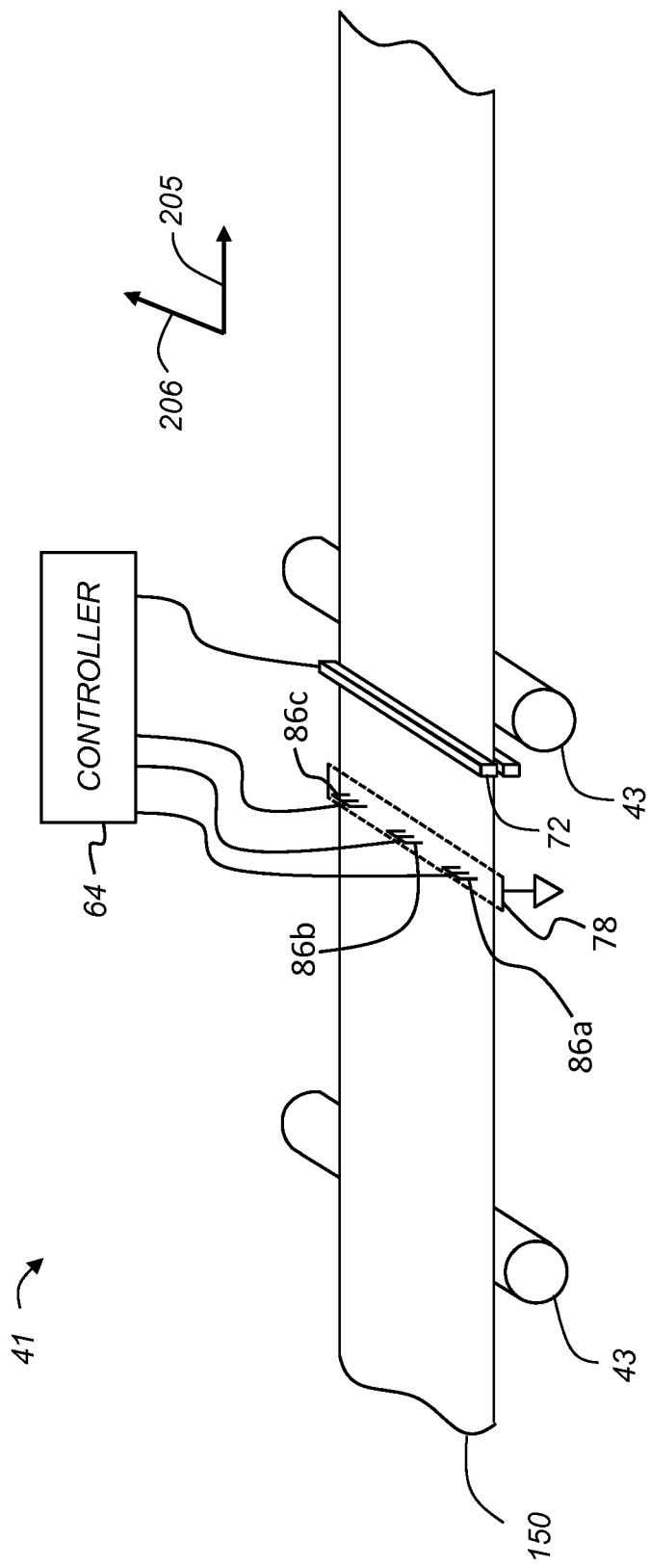
FIG. 10 shows a schematic view of a portion of a web transport system including a plurality of ionizing electrodes that provide adjustable electrostatic forces to a web of media responsive to signals from a photoelastic measurement device.

FIGS. 8-10 illustrate alternate embodiments of web transport systems 41 where non-uniform stresses across the width of the web of media 150 are compensated for by applying adjustable forces onto the surface of the web of media 150. In the illustrated embodiments, a full-width photoelastic measurement device 72 is used which provides a stress profile across the entire width of the web of media 150. Typically, the full-width photoelastic measurement device 72 will include an array of sensors 34 (FIG. 3) distributed across the cross-track direction 206 of the web of media 150, thereby enabling the stress to be determined as a function of cross-track position. (The full-width photoelastic measurement device 72 can be viewed as an array of individual photoelastic measurement devices at positions corresponding to the positions of the sensors 34.) In other embodiments a plurality of individual photoelastic measurement devices 46, 48 can be used to measure the stress at different positions along a cross-track direction 206 of the web of media 150 as was illustrated in FIG. 7. The magnitude of the adjustable forces and the cross-track position at which the adjustable forces are applied to the web of media are adjusted under the control of controller 64 based on the stress profile or stress differential measured using the photoelastic measurement device 72.

In the configuration of FIG. 8, the adjustable forces are applied normal to the surface of the web of media 150 using a plurality of narrow rollers 74a, 74b, 74c distributed across the width of the web of media 150, positioned between web-guiding rollers 43 in the web transport system 41. In some embodiments, the web-guiding rollers 43 can be impression cylinders 260, 262 (FIG. 5). The magnitude of the force applied by each of the rollers 74a, 74b, 74c can be controlled by adjusting the vertical position of the rollers 74a, 74b, 74c using corresponding actuators (denoted by the double arrows) in response to control signals from the controller 64. For example, if the controller 64 determines that the stress is lower along front edge 82 than along back edge 84, then the controller 64 would signal the actuator associated with narrow roller 74a to move downward to apply a force to the web of media 150 that is normal to its surface. The applied force will cause the stress to rise along the front edge 82 of the web of media 150, thereby reducing the stress differential across the width of the web of media 150. This will reduce the tendency of the web of media 150 to drift in the cross-track direction 206. The controller 64 can use a process control algorithm to periodically evaluate the stress profile and make corresponding adjustments to the forces provided by the rollers 74a, 74b, 74c in order to maintain the web transport system 41 in a controlled state. In some embodiments, rollers 74a and 74c may be skewed relative to the in-track direction 205 of the web of media 150, such that the rollers 74a and 74c impart a media-spreading lateral force on the web of media 150. The skew angle or the contacting force normal to the surface of the web of media 150 can be adjusted by the controller in response to the stress profile across the web of media 150 measured by the photoelastic measurement device 72.

While the use of only two force applying rollers 74a, 74c would be sufficient to reduce the stress gradient across the width of the web of media 150 that causes the web of media 150 to drift in the cross-track direction 206, the use of three or more force-applying rollers 74a, 74b, 74c can further reduce the level of overall stress variation across the width of the web of media 150. This can reduce the risk of developing wrinkles in the web of media 150 that can form creases in the web of media 150. This approach can also be used to control expansion of the web of media 150 in the cross-track direction 206.

In FIG. 9, the adjustable forces are applied by air blown at the surface of the web of media 150 using air sources 76a, 76b, 76c. The air sources 76a, 76b, 76c can comprise adjustable-speed blowers, whose speed is controlled by the controller 64 to control the flow rate of the air directed from the nozzles of the air sources 76a, 76b, 76c toward the web of media 150. Alternatively, a fixed-speed blower can be used with a flow control mechanism (e.g., a variable flow valve or an adjustable baffle) that controls the air flow provided by the air sources 76a, 76b, 76c. In embodiments using a flow control mechanism with a fixed-speed blower, a single fixed-speed blower can be used to supply air to the nozzles of each of the air sources 76a, 76b, 76c, with separate flow control mechanisms being associated with each of the individual air sources 76a, 76b, 76c. Alternatively, separate blowers can be associated with each of the air sources 76a, 76b, 76c. As the adjustable force in this case is applied by a flow of air rather than by physically contacting the web of media 150 with roller, it reduces the risk of scuffing of the media when compared to the configuration of FIG. 8. By controlling the air flow rate from each of the air sources 76a, 76b, 76c, varying amounts of force can be applied normal to the web of media 150 by each of the air sources 76a, 76b, 76c in response to the stress profile measured by the photoelastic measurement device 72 to produce a more uniform stress profile across the width of the web of media 150.

In FIG. 10, the adjustable forces are applied to the media electrostatically. In the illustrated configuration, the controller 64 causes an electrostatic charge to be selectively applied to portions of the web of media 150 responsive to the stress profile measured using the photoelastic measurement device 72. A force normal to the surface of the web of media 150 can then be applied to the charged portions of the media by passing the web of media 150 through an imposed electric field, or by having the web of media 150 pass adjacent to a grounded conductor.

Figure 11:
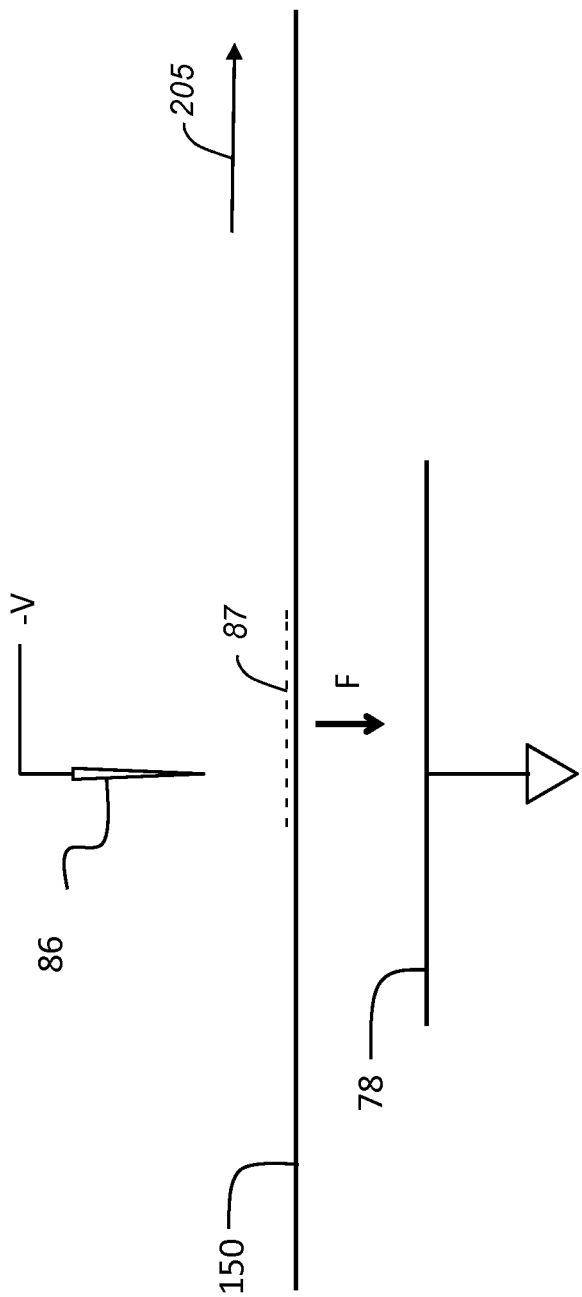
FIG. 11 shows a schematic side view of an ionizing electrode that provides an electrostatic force on a web of media.

A preferred means for selectively applying the charge comprises one or more needle shaped ionizing electrodes 86 biased to a high voltage V (typically a negative voltage) positioned adjacent to one side of the web of media 150 and a grounded counter electrode 78 on the opposite side of the web of media 150, as shown in FIG. 11. The counter electrode 78 has an extended area, in contrast to the needle-like ionizing electrode 86. The counter electrode 78 can comprise a grounded metal plate adjacent to the second side of the web of media 150. The web of media 150 need not touch the counter electrode 78. Alternatively the counter electrode 78 can comprise a metal roller over which the web of media 150 travels. The potential between the ionizing electrode 86 and the counter electrode 78 is sufficient to create a corona discharge at the points of the needle-like ionizing electrode 86 that ionizes the air, forming negative ions that are accelerated toward the counter electrode 78. These ions strike and build up a charge 87 on the web of media 150, which is positioned between the ionizing electrode 86 and the counter electrode 78, thereby charging the web of media 150. The charged media is then attracted toward the grounded counter electrode 78 with a force F.

The configuration of FIG. 10 shows three ionizing electrode groups 86a, 86b, 86c distributed across the width of the web of media 150. By varying the potential applied to the different ionizing electrode groups 86a, 86b, 86c, the controller 64 can adjust the amount of force applied to different portions of the web of media 150. As the electrostatically-adjustable force doesn't involve any mechanical hardware in the making of an adjustment, this embodiment has a faster response rate than the embodiments of FIGS. 8 and 9.

Figure 12:
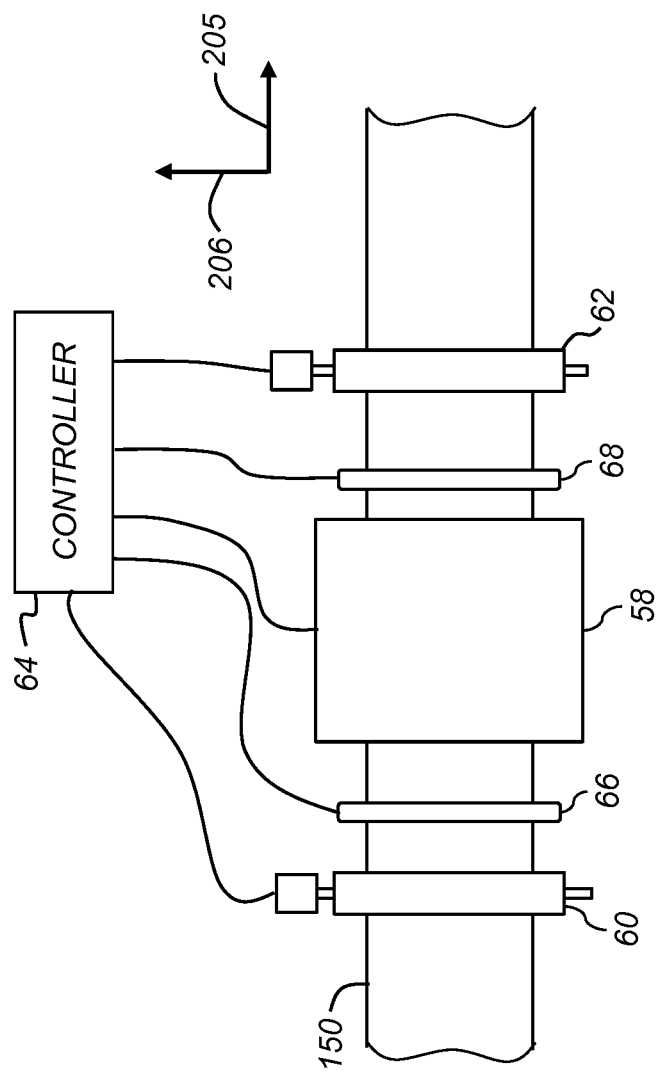
FIG. 12 shows a schematic top view of a portion of a web transport system including an energy transfer device which is controlled using signals from photoelastic measurement devices.

As illustrated in FIG. 12, many printing processes require the web of media 150 to pass through an energy transfer device 58, such as a dryer, a fusing station or a UV curing unit. The energy transfer device 58 transfers energy to the web of media 150 to perform various functions, such as evaporating water or other carrier solvents in a printed ink, enhancing the crosslinking of polymers in a printed ink, or fusing toner particles to the web of media 150. Excessive temperatures however can damage or degrade the material from which the web of media 150 is formed. By monitoring the stress in the web of media 150 at positions both upstream and downstream of the energy transfer device 58 using photoelastic measurement devices 66 and 68, respectively, the controller 64 can detect changes in stress in the web of media 150 that can serve as precursors of thermal degradation of the material or of thermally-induced inelastic deformation of the web of media 150. For example, at the glass transition temperature, the material may begin to soften. Such softening is accompanied by changes in the stress in the material that are measurable with the photoelastic measurement devices 66, 68. Such thermally-induced softening may occur throughout the web of media 150, or in some cases, the softening may be detected in the vicinity of hot spots on the web of media 150, such as adjacent to printed portions of the web of media 150 that absorb more radiated heat from the dryer lamps, or in portions of the web of media 150 aligned with portions of the energy transfer device 58 having a higher power density than other portions of the energy transfer device 58.

In the embodiment of FIG. 12, the photoelastic measurement devices 66, 68 are used to monitor stress in the web of media 150 upstream and downstream of the energy transfer device 58. By comparing the measured stresses in the web of media 150 upstream and downstream of the energy transfer device 58, the onset of the thermally-induced softening can be detected. The controller can then make adjustments to at least one of the amount of energy or power provided by the energy transfer device 58, the speed of the web of media 150 through the energy transfer device 58, or the tension of the web of media 150 as it passes through the energy transfer device 58 to avoid damage or degradation of the web of media 150. In the illustrated configuration, there are two drive rollers 60 and 62 that are used to drive the web of media 150 through the printing system. Adjustments to the speed of the web of media can be made by way of adjustments to the drive speed of the drive rollers 60, 62. Web tension adjustments are made by way of adjustments to the differential drive speed of the two drive rollers 60, 62.

The photoelastic measurement devices 66, 68 are shown as spanning the width of the web of media 150. Such an arrangement enables the stress profile to be measured across the width of the web of media 150, which enables the detection of local hot spots on the web of media 150 by identifying local changes in the stress profile. In some embodiments, the controller 64 can adjust the spatial distribution of energy provided by the energy transfer device 58 in response to the detection of local hot spots. This can improve the uniformity of the stress profile across the web of media 150. As an alternative to photoelastic measurement devices 66, 68 that span the width of the media, multiple photoelastic measurement devices can be used, each photoelastic measurement device being used to measure the stress in the media at a different cross-track position.

Figure 13:
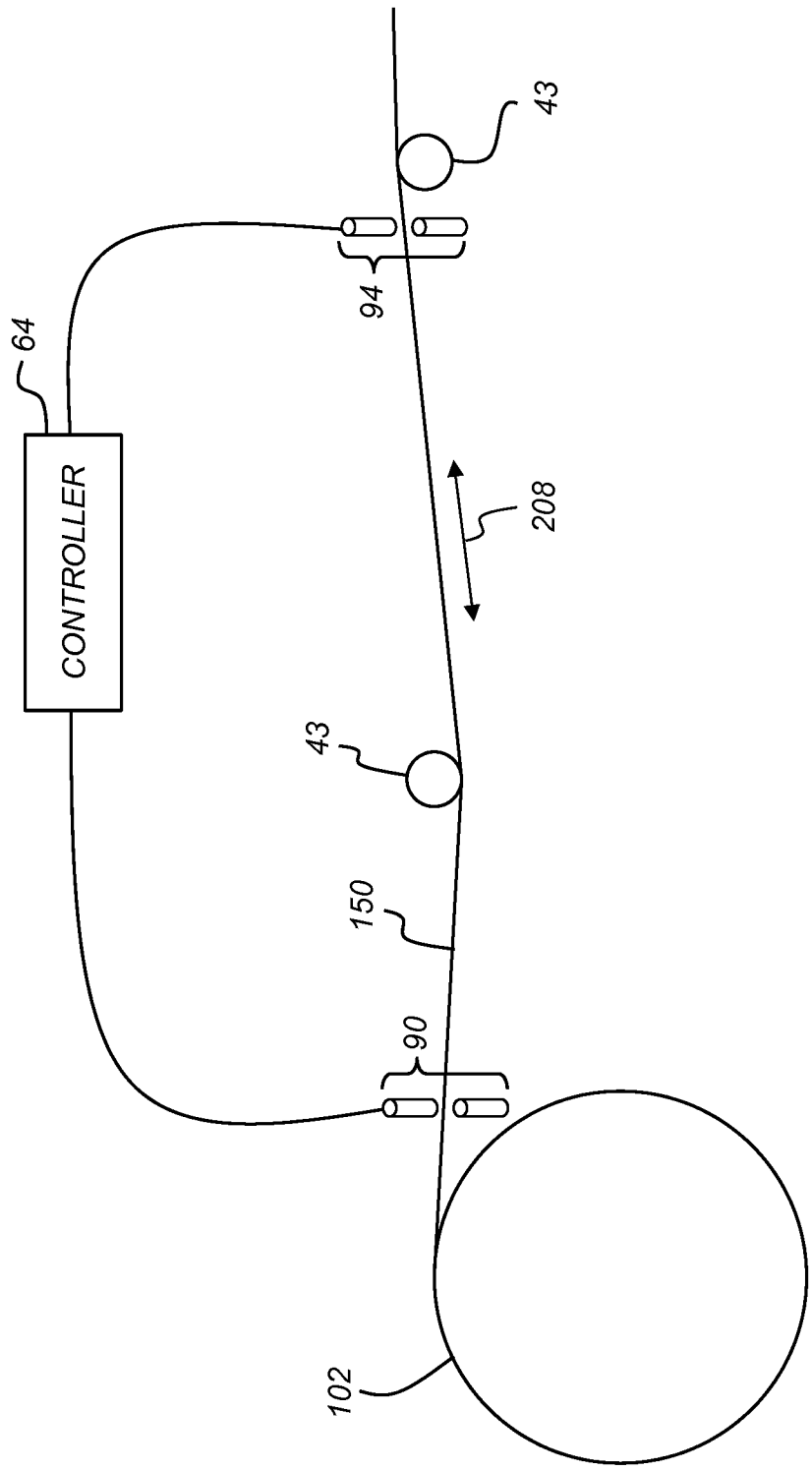
FIG. 13 shows a schematic side view of a portion of a web transport system including photoelastic measurement devices that are used to determine changes in stress relative to an initial stress.

The stresses measured by the photoelastic measurement device can include not only the stresses induced in the media as it passes through the printing system, but can also include residual stresses from the manufacturing process that haven't been annealed out. As these residual stresses may have no effect on subsequent printing operations, it can be useful to identify the residual stresses prior to the application of stresses in the printing process so that the system isn't trying to make adjustments to correct for the residual stresses. For this reason, the embodiment of FIG. 13 includes a first photoelastic measurement device 90 immediately downstream of the media supply roll 102 to characterize an initial stress in the web of media 150. Preferably the supply roll 102 is controlled to feed out the web of media 150 without the need to pull the web of media 150 under tension from the supply roll 102 so that the web of media 150 is not under tension as it passes the first photoelastic measurement device 90. The initial stresses measured with the first photoelastic measurement device 90 will correspond to any residual stresses in the web of media 150 left from the media manufacturing process.

One or more additional photoelastic measurement devices 94 are located downstream of the first photoelastic measurement device 90 for monitoring the stress in the web of media 150 at positions along the web transport path 208 to enable the controller 64 to control at least one aspect of the printing system based on the measured stresses. The outputs of the both the first photoelastic measurement device 90 and the downstream photoelastic measurement device 94 are provided to the controller 64. The controller 64 can then determine the change in stress at the downstream location relative to the residual stress measured by the first photoelastic measurement device 90. By accounting for any residual stresses in the web of media 150, the controller 64 is able to control the printing system more effectively. Various aspects of the printing system can be controlled responsive to the change in stress, including controlling a rotational speed of a roller 43 in the web advance system to adjust the web tension. In some arrangements, an aspect of a printing station downstream of the downstream photoelastic measurement device 94 can be controlled responsive to the change in stress (e.g., the rotational speed of a printing cylinder 220 (FIG. 5) in the downstream printing station can be adjusted accordingly).

In some embodiments, the downstream printing station is a digital printing station that can deposit printing material onto the web of media 150 according to digital image data. For example, the digital printing station can be a continuous inkjet printing station which ejects drops of ink onto the web of media 150 using an inkjet head having an array of nozzles. The change in stress in the web of media 150 can cause the media to stretch, and can produce registration errors between image data printed at different printing stations. These registration errors can be compensated for by adjusting the placement of the drops of ink printed by the downstream printing station. For example, the timing at which the image data is printed can be adjusted to compensate for the stretching of the web of media 150 so that the drops are printed in registration with the corresponding image data printed by the upstream printing station.

For cases where the residual stress is found to be variable along the length of the web of media 150, the controller 64 can be configured to account for the transit time required for a particular location on the web of media 150 to travel from the first photoelastic measurement device 90 to the downstream photoelastic measurement device 94. In this way, the stress for a particular location on the web of media 150 measured using the downstream photoelastic measurement device 94 can be compared to the stress measured when the same location passed the first photoelastic measurement device 90 at an earlier time.

It has been observed that the printed image formed on a web of media 150 by a printing system (e.g., printing system 100 of FIG. 1 or printing system 200 of FIG. 2) can alter the local stresses in the media. As a result, photoelastic measurement devices can also be useful in such cases for providing diagnostic tests for defects in the pattern printed on the web of media 150. There are several mechanisms by which the printed image can affect the local stresses in the media. For example printing material 160 (ink or toner) applied to the web of media 150 during the printing process can add to the local stiffness of the media. As the web of media 150 is pulled through the printing system under tension, the added printing material 160 is stressed along with the media, which alters the localized stresses in the media adjacent to the printed image as indicated in FIG. 14A. As the printing material 160 is dried or cured on the web of media 150, the printing material 160 could shrink as illustrated in FIG. 14B or could expand as illustrated in FIG. 14C. Such shrinkage or expansion of the printing material 160 can produce local stresses in the web of media 150 that deform the media. These local stresses can be characterized using photoelastic measurements. The printing material 160 can also add locally to the thickness to the printed media. If the printed media is passed between nip rollers, the pressure applied to the face of the printed media can press the printed image into the web of media 150, as shown in FIG. 14D, and thereby produce localized stresses in the media that can be photoelastic measurements.

Figure 15:
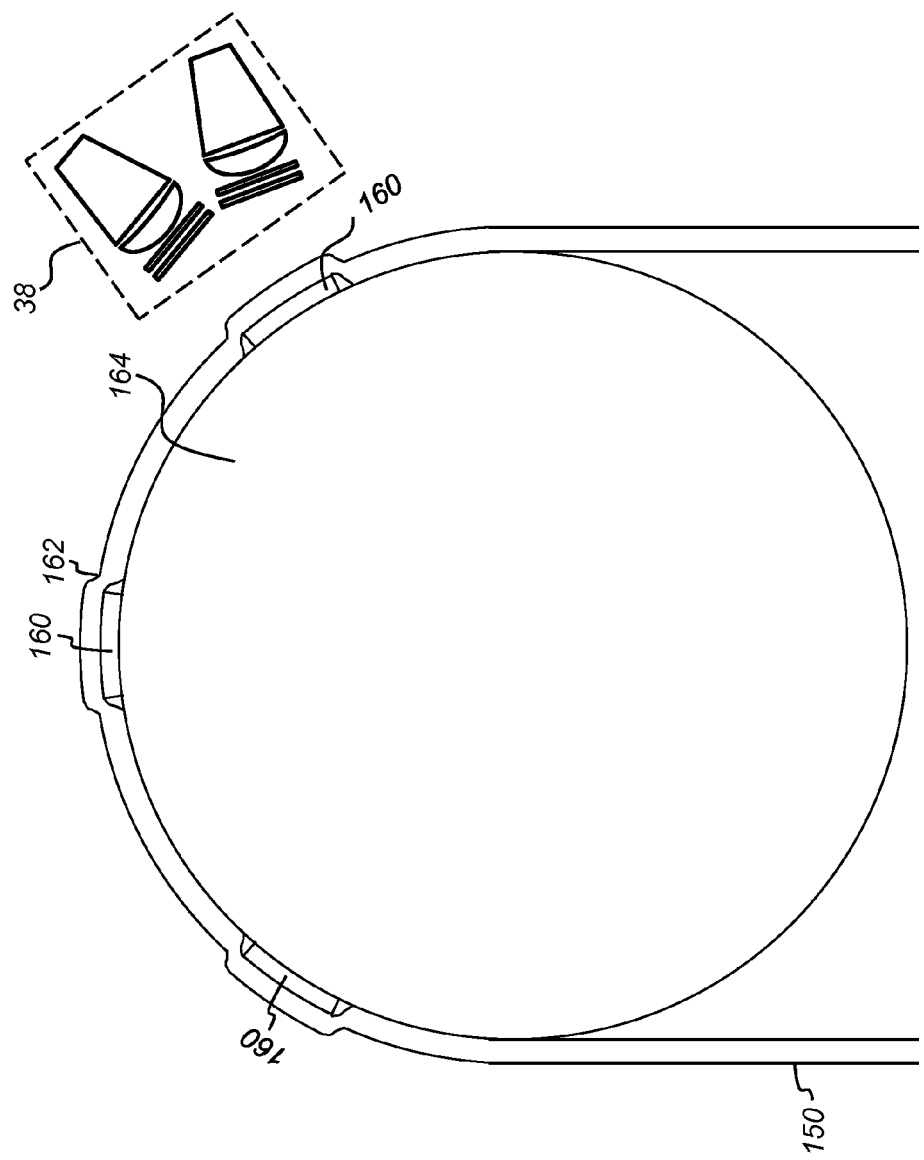
FIG. 15 shows a schematic side view of a portion of a web transport system including a reflective photoelastic measurement device for characterizing localized stress in a printed image.

As shown in FIG. 15 when printed media 162 (i.e., a web of media 150 with printing material 160 printed thereon) is partially wrapped under tension around a roller 164 with the printed face of the printed media 162 facing toward the roller 164, the thickness of the printing material 160 on the printed media 162 can lead to localized deformation of the printed media 162. These deformations will produce localized stress variations in the printed media 162 adjacent to the printed regions, which can be characterized using photoelastic measurements. As these stresses are present while the media is wrapped around the roller, they are most readily measured using a reflective photoelastic measurement device 38.

Figure 16:
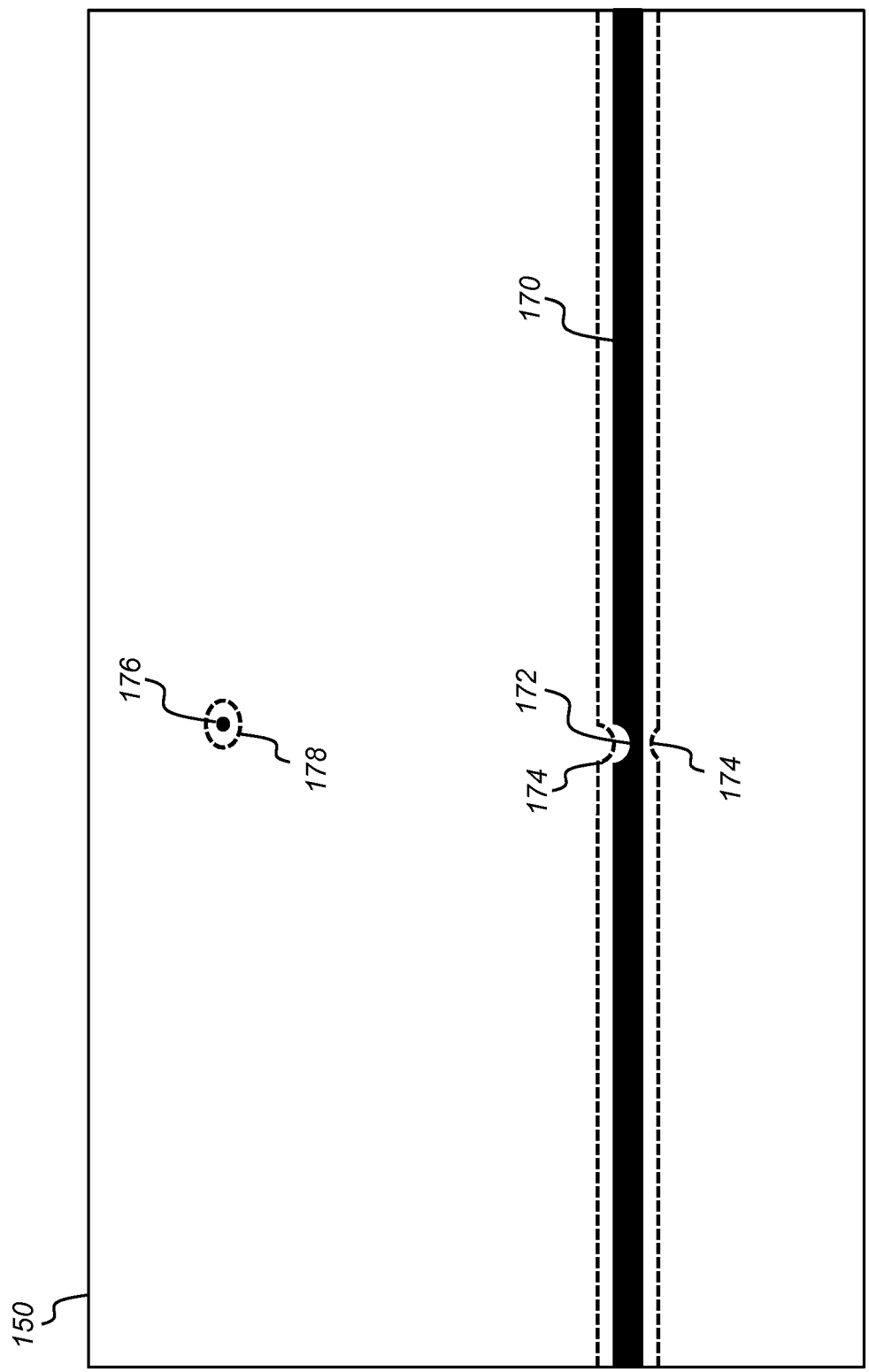
FIG. 16 illustrates how defects in a printed image can be detected from stress contours detected using a photoelastic measurement device.

Through these mechanisms and others, the printed image can induce localized stresses in the printed media 162 that are detectable using photoelastic measurements. Any defects in the printed image will produce corresponding changes in the pattern of localized stresses that can be detected by analyzing the photoelastic measurements. For example, with reference to FIG. 16, if there were a pinhole defect 172 in a printed line 170, it would produce a distortion in measured stress contours 174 in the vicinity of the pinhole defect 172. Similarly, a stray dot 176 of printing material deposited on the web of media 150 in an unintended location can produce localized stresses in that vicinity detectable by analyzing measured stress contour 178.

The patterns of stress can be analyzed to detect the print defects using any method known in the art. In an exemplary arrangement, stress contours (i.e., contours of constant stress) are determined which can be compared to reference stress contours determined for defect-free printed images. Any substantial differences between the shapes of reference stress contours and the measured stress contours can be identified to provide an indication that a print defect is present in the printed image. Within the context of the present invention, "substantial differences" are differences having a larger magnitude than any random differences that occur within a collection of defect-free printed images.

This method for detecting print defects in the printed image can be particularly useful for cases where the contrast between the color of the printing material and the web of media 150 is relatively small (e.g., when substantially clear or colorless printing material is printed onto transparent media), making print defects in the printed image difficult to detect using conventional computer vision methods. Within the context of the present invention, a substantially clear of colorless printing material is one that has an optical density of less than 0.1. The method can also be particularly useful for cases where the printed image contains features (e.g., narrow lines) that are too small to easily detect using standard-resolution optical imaging devices.

The detection of print defects in the printed image is useful for many quality control applications. For example, if anomalies in the stress contours are detected using photoelastic measurements, an aspect of the printing system that the controller 64 can control can include a mechanism for causing a corresponding portion of the web of media 150 to be tagged as defective. In some arrangements, the tagging of the portion of the web of media 150 as defective can include forming visible or invisible marks to the web of media 150 in proximity to the defective portion. In some arrangements, the mark can be formed by depositing marking material onto the web of media 150 using a downstream printing station (e.g., an inkjet printhead). In other arrangements, the mark can be formed using other mechanisms. For example, a heat source (e.g., a laser) can be used to apply heat to the web of media, thereby causing a mark that is detectable using appropriate means. For example, commonly-assigned U.S. Pat. No. 8,931,874 to Piatt et al., entitled "Media-tracking system using marking heat source," which incorporated herein by reference, discloses a number of arrangements for forming marks using a marking heat source that can be used in accordance with the present invention.

Alternately, the tagging of the portion of the web of media 150 can include storing metadata in a digital memory that provides an indication that a particular portion of the printed image includes a print defect. One such method for storing metadata associated with a printed image that could be used in accordance with the present invention is described in commonly-assigned U.S. Pat. No. 8,582,156 to Rudolph et al., entitled "Printing system control using multiple metadata packets," which is incorporated herein by reference. In some arrangements, the metadata can indicate a location of the print defect. For example, if the printed images on the web of media 150 include a sequence of devices, each device can be assigned a unique numerical identifier, and the metadata can identify the numerical identifier of the device that includes the print defect.

In some embodiments, the defective portions of the printed media can be discarded after they are identified. For example, if the printing system 200 (FIG. 2) is used to print patterns of electrodes for touch screen devices, any devices that are found to include print defects can be discarded before they undergo additional costly assembly operations. In some embodiments, the identified defective portions can undergo further quality control testing before determining whether the print defects are significant enough that the defective portions should be discarded. The quality control testing can either be performed as a downstream operation in the printing system, or as an off-line operation performed at a later time.

In some arrangements, an aspect of the printing system controlled responsive to detecting print defects using photoelastic measurements can include one or more mechanisms for taking corrective actions to eliminate the detected print defects. The corrective actions can include selective deposition of one or more materials at the site of the print defect, such as by inkjet deposition of material, or selective removal of material from the site of the print defect, such as by laser ablation of material.

In some arrangements, an aspect of the printing system controlled responsive to signals to detecting print defects using photoelastic measurements can include utilizing one or more mechanisms to perform a corrective action to eliminate the cause of the print defect, thereby preventing the formation of print defects in subsequent printed images. Such mechanisms can include adjusting an operating parameter of the printing system to improve system operation, activating a cleaning system to clean a portion of the printing system (e.g., an inkjet printhead cleaning device), utilizing one or more mechanisms to repairing a defect in a printing plate such as by selective deposition or removal of material on a portion of the printing plate or by altering material property of a portion of the printing plate, or by signaling an operator to take corrective actions such as replacing a printing plate in the printing system.

The exemplary embodiments discussed above have generally been described with respect to flexographic printing systems. Flexographic printing systems are examples of contact printing systems which transfer printing material to the media by contact between a printing cylinder and the web of media. It will be obvious to one skilled in the art that the invention can also be practiced with a wide variety of other printing technologies. For example, the invention can be practiced with other types of contact printing systems including offset printing systems, gravure printing systems and electrophotographic printing systems. It can also be practiced with various types of non-contact printing systems such as continuous inkjet printing systems in which printing material is ejected onto the media through an array of inkjet nozzles that are separated from the web of media by a gap distance. In addition to the web-based printing systems described herein, the invention can also be practiced with sheet fed printing systems where photoelastic measurement devices are used to characterize stress in sheets of media as they are advanced along a media transport path.

The invention has been described in detail with particular reference to certain preferred embodiments thereof, but it will be understood that variations and modifications can be effected within the spirit and scope of the invention.

PARTS LIST 20 photoelastic measurement device
21 illumination optical components
22 light source
23 lens
24 linear polarizer
26 quarter wave plate
27 circular polarizing filter
29 detection optical components
30 quarter wave plate
32 linear polarizer
33 lens
34 sensor
35 circular polarizing filter
36 reflector
38 photoelastic measurement device
40 processor
41 web transport system
42 roller
43 roller
44 roller
46 photoelastic measurement device
48 photoelastic measurement device
50 pivot arm
52 actuator
54 caster axis
56 rotation axis
58 energy transfer device
60 drive roller
62 drive roller
64 controller
66 photoelastic measurement device
68 photoelastic measurement device
72 photoelastic measurement device
74a roller
74b roller
74c roller
76a air source
76b air source
76c air source
78 counter electrode
82 front edge
84 back edge
86 ionizing electrode
86a ionizing electrode group
86b ionizing electrode group
86c ionizing electrode group
87 charge
90 photoelastic measurement device
94 photoelastic measurement device
100 printing system
102 supply roll
104 take-up roll
105 roll-to-roll direction
106 web-transport roller
107 web-transport roller
110 print station
111 plate cylinder
112 flexographic printing plate
113 raised features
114 impression cylinder
115 anilox roller
116 UV curing module
117 printing cylinder
118 photoelastic measurement device
120 print station
121 plate cylinder
122 flexographic printing plate
124 impression cylinder
125 anilox roller
126 UV curing module
127 printing cylinder
128 photoelastic measurement device
130 print station
131 plate cylinder
132 flexographic printing plate
134 impression cylinder
135 anilox roller
136 UV curing module
137 printing cylinder
138 photoelastic measurement device
140 print station
141 plate cylinder
142 flexographic printing plate
144 impression cylinder
145 anilox roller
146 UV curing module
147 printing cylinder
148 photoelastic measurement device
150 web of media
151 first side
152 second side
160 printing material
162 printed media
164 roller
170 printed line
172 pinhole defect
174 stress contour
176 stray dot
178 stress contour
200 printing system
205 in-track direction
206 cross-track direction
208 web transport path
210 printing cylinder
211 motor
212 master image
214 master image
215 master image boundary
216 master image boundary
220 printing cylinder
221 motor
252 printed image
254 printed image
255 frame boundary
260 impression cylinder 262 impression cylinder
270 web-transport roller
272 photoelastic measurement device
274 photoelastic measurement device
F force
L repeat length
L' repeat length
$C_I$ circumference
$C_P$ circumference
$C_R$ circumference
V voltage

The invention claimed is:

1. A printing system for printing an image on a web of media that is photoelastic and at least partially transparent, comprising:
 a web advance system for advancing the web of media supplied from an input roll in an in-track direction along a web transport path;
 at least one printing station disposed along the web transport path for printing on the web of media;
 one or more photoelastic measurement devices disposed along the web transport path for characterizing stress in the web of media;
 an energy transfer device that transfers energy to the web of media for drying or curing a printed substance, wherein at least one of the one or more photoelastic measurement devices is disposed downstream of the energy transfer device; and
 a controller that controls at least one aspect of the printing system responsive to signals received from the one or more photoelastic measurement devices, including controlling an amount of energy or a spatial distribution of energy provided by the energy transfer device responsive to signals received from the at least one photoelastic measurement device disposed downstream of the energy transfer device.

2. The printing system of claim 1, wherein the one or more photoelastic measurement devices includes a first photoelastic measurement device disposed downstream of the input roll and upstream of a printing station located nearest to the input roll; and wherein the first photoelastic measurement device is configured to send a signal to the controller characterizing an initial stress in the web of media.

3. The printing system of claim 2, wherein the one or more photoelastic measurement devices further includes a second photoelastic measurement device disposed at a downstream position which is downstream of the first photoelastic measurement device, wherein the second photoelastic measurement device is configured to send a signal to the controller characterizing a downstream stress in the web of media at the downstream position, and wherein the controller is configured to control at least one aspect of the printing system responsive to a difference between the downstream stress in the web of media and the initial stress in the web of media.

4. The printing system of claim 3, wherein a rotational speed of a roller in the web advance system is adjusted responsive to a difference between stresses in the web of media determined using the first and second photoelastic measurement devices.

5. The printing system of claim 1, wherein the one or more printing station includes:
 a first printing station for printing a first portion of the image; and
 a second printing station located downstream of the first printing station for printing a second portion of the image in registration with the first portion of the image.

6. The printing system of claim 5, wherein at least one of the one or more photoelastic measurement devices is disposed downstream of the first printing station and upstream of the second printing station.

7. The printing system of claim 6, wherein an aspect of the second printing station is controlled responsive to signals received from the photoelastic measurement devices disposed downstream of the first printing station and upstream of the second printing station.

8. The printing system of claim 7, wherein the second printing station is a digital printing station, and the controlled aspect of the second printing station is a timing at which image data is printed.

9. The printing system of claim 7, wherein the second printing station includes a printing cylinder for transferring a printing material to the web of media, and the controlled aspect of the second printing station is a rotational speed of the printing cylinder.

10. The printing system of claim 1, further including a web tension control system for controlling a tension in the web of media, wherein the controller is configured to control the web tension control system responsive to the signals received from the one or more photoelastic measurement device.

11. The printing system of claim 1, wherein an aspect of the printing system is controlled responsive to a difference between a stress in the web of media determined at a first time and a stress in the web of media determined at a second later time.

12. The printing system of claim 1, further including an apparatus for providing an adjustable force onto a surface of the web of media in a direction normal to the surface, wherein a magnitude of the force is adjusted responsive to the signals received from the one or more photoelastic measurement device.

13. The printing system of claim 1, wherein the one or more photoelastic measurement devices include a plurality of photoelastic measurement devices that are separated from one another along a cross-track direction of the web of media.

14. The printing system of claim 1, wherein the at least one printing station is a flexographic printing station or an inkjet printing station.

15. A method for controlling a printing system adapted to print images on a web of media that is photoelastic and at least partially transparent, comprising:
 transporting the web of media through the printing system along a web transport path using a web advance system;
 printing on the web of media using at least one printing station disposed along the web transport path;
 characterizing stresses in the web of media using a plurality of photoelastic measurement devices disposed along the web transport path, wherein the plurality of photoelastic measurement devices include two photoelastic measurement devices that are separated from one another along a cross-track direction of the web of media; and
 controlling at least one aspect of the printing system responsive to a difference between stresses in the web of media in the cross-track direction determined using signals received from the two photoelastic measurement devices that are separated from one another along a cross-track direction of the web of media.

16. The method of claim 15, wherein the printing system includes an apparatus for providing an adjustable force onto a surface of the web of media at a particular cross-track position in a direction normal to the surface, and wherein the controlling of the printing system includes adjusting a magnitude or cross-track position of the provided force responsive to the difference between stresses in the web of media in the cross-track direction.

17. A printing system for printing an image on a media that is photoelastic and at least partially transparent, comprising:
- a media advance system for advancing the media in an in-track direction along a media transport path;
- at least one printing station disposed along the media transport path for printing on the media;
- one or more photoelastic measurement devices disposed along the media transport path for characterizing stress in the media; and
- a controller that controls at least one aspect of the printing system responsive to signals received from the one or more photoelastic measurement devices;
- wherein the one or more photoelastic measurement devices are configured to characterize localized stress within an image printed by the printing system, and wherein the localized stress is at least partially induced by printing material deposited by the printing system.

18. The printing system of claim 17, wherein the localized stress is analyzed to detect a print defect, and wherein the aspect of the printing system controlled responsive to signals received from the one or more photoelastic measurement devices includes a device to tag a portion of the web of media as defective or to take corrective action to eliminate the detected print defect.

19. The method of claim 15, wherein the controlling of the printing system includes adjusting a rotation axis of a roller in the web advance system responsive to the difference between stresses in the web of media in the cross-track direction.

* * * * *